United States Patent
Umeya

(10) Patent No.: US 7,193,777 B2
(45) Date of Patent: Mar. 20, 2007

(54) PROJECTION SCREEN AND PROJECTION SYSTEM COMPRISING THE SAME

(75) Inventor: Masanori Umeya, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 95 days.

(21) Appl. No.: 10/934,767

(22) Filed: Sep. 7, 2004

(65) Prior Publication Data

US 2005/0122582 A1 Jun. 9, 2005

(30) Foreign Application Priority Data

Sep. 8, 2003 (JP) ............................. 2003-315226

(51) Int. Cl.
- G03B 21/60 (2006.01)
- G02B 5/30 (2006.01)
- G02B 27/28 (2006.01)
- G02B 5/02 (2006.01)
- G02B 13/20 (2006.01)
- C09K 19/02 (2006.01)
- G02F 1/1335 (2006.01)

(52) U.S. Cl. ............ 359/459; 359/492; 359/599; 359/487; 349/185; 349/87; 349/96; 349/176; 349/115

(58) Field of Classification Search .............. 359/443, 359/454, 459, 600, 492, 452, 599, 487; 349/175, 349/185, 87, 96, 176, 115
See application file for complete search history.

(56) References Cited

U.S. PATENT DOCUMENTS

| | | | | |
|---|---|---|---|---|
| 5,486,884 A | * | 1/1996 | De Vaan | 353/122 |
| 6,381,068 B1 | * | 4/2002 | Harada et al. | 359/443 |
| 6,693,686 B2 | * | 2/2004 | Umeya | 349/98 |
| 6,906,764 B2 | * | 6/2005 | Kashima et al. | 349/98 |
| 2005/0041285 A1 | * | 2/2005 | Umeya | 359/449 |

FOREIGN PATENT DOCUMENTS

| | | | |
|---|---|---|---|
| EP | 648048 A1 * | 4/1995 | |
| EP | 1046934 A1 * | 10/2000 | |
| EP | 1286189 A2 * | 2/2003 | |

* cited by examiner

Primary Examiner—W. B. Perkey
Assistant Examiner—Magda Cruz
(74) Attorney, Agent, or Firm—Oliff & Berridge, PLC

(57) ABSTRACT

A projection screen including a polarized-light selective reflection layer having a cholesteric liquid crystalline structure that causes selective diffuse-reflection of a specific polarized-light component, and a substrate for supporting the polarized-light selective reflection layer. The polarized-light selective reflection layer includes three partial selective reflection layers, each of which contains molecules of a liquid crystal made from an organic compound, forming an organic film as a whole, and has a cholesteric liquid crystalline structure that causes selective diffuse-reflection of a specific polarized-light component. Each partial selective reflection layer of the polarized-light selective reflection layer is ordered according to wavelength of the range of light reflected. Beginning from the observation side, the order is as follows: blue (B) color wave range, green (G) color wave range, and red (R) color wave range.

21 Claims, 10 Drawing Sheets

PROJECTION SCREEN AND PROJECTION SYSTEM COMPRISING THE SAME

BACKGROUND OF THE INVENTION

1. Field of the Invention

The present invention relates to a projection system in which imaging light emitted from a projector is projected on a projection screen to produce thereon an image. More particularly, the present invention relates to a projection screen capable of sharply displaying an image and of providing high image visibility, and to a projection system comprising such a projection screen.

2. Description of Related Art

A conventional projection system is usually as follows: imaging light emitted from a projector is projected on a projection screen, and viewers observe the light reflected from the projection screen as an image.

Typical examples of materials for projection screens for use in such conventional projection systems include white-colored paper or cloth materials, and plastic films coated with white inks that diffuse light. Besides, high-quality projection screens that comprise diffusing layers containing beads, pearlescent pigments, or the like, capable of controlling the diffusion of imaging light, are now commercially available.

Since projectors have become smaller in size and moderate in price in recent years, demand for household projectors such as projectors for family theaters is growing, and an increasing number of families are now enjoying projection systems. Household projection systems are often placed in living rooms or the like, which are usually so designed that environmental light such as sunlight and light from lighting fixtures come in abundantly. Projection screens for use in household projection systems are, therefore, required to show good image display performance even under bright environmental light.

It is however not easy for the above-described conventional projection screens to show good image display performance under bright environmental light because they reflect not only imaging light but also environmental light such as sunlight and light from lighting fixtures.

In such a conventional projection system, differences in the intensity of light (imaging light) projected on a projection screen from a projector cause light and shade to form an image. For example, in the case where a white image on a black background is projected, the projected-light-striking part of the projection screen becomes white and the other part becomes black; thus, differences in brightness between white and black cause light and shade to form the desired image. In this case, in order to attain excellent image display, it is necessary to make the contrast between the white- and black-indication parts greater by making the white-indication part lighter and the black-indication part darker.

However, since the above-described conventional projection screen reflects both imaging light and environmental light such as sunlight and light from lighting fixtures without distinction, both the white- and black-indication parts get lighter, and differences in brightness between white and black become small. For this reason, the conventional projection screen cannot satisfactorily provide good image display unless the influence of environmental light such as sunlight and light from lighting fixtures on the projection screen is suppressed by using a means for shading a room, or by placing the projection screen in a dark environment.

Under these circumstances, studies have been made on projection screens capable of showing good image display performance even under bright environmental light. There have so far been proposed projection screens using, for example, holograms or polarized-light-separating layers (see Japanese Laid-Open Patent Publications No. 107660/1993. (Patent Document 1) and No. 540445/2002 (Patent Document 2)).

Of these conventional projection screens, those ones using holograms have the advantage that the white-indication part can be made lighter if their light-diffusing effect is properly controlled, so that they can show relatively good image display performance even under bright environment light. However, holograms have wavelength selectivity but no polarization selectivity, so that the projection screens using holograms can display images only with limited sharpness. Moreover, because of production problems, it is difficult to produce large-sized projection screens by making use of holograms.

On the other hand, on the above-described conventional projection screens using polarized-light-separating layers, it is possible to make the white-indication part lighter and the black-indication part darker. Therefore, these projection screens can sharply display images even under bright environmental light as compared with the projection screens using holograms.

Specifically, Patent Document 1 describes a projection screen for which a cholesteric liquid crystal that reflects red, green and blue light (right- or left-handed circularly polarized light) contained in imaging light is used in order to make, by making use of the circularly-polarized-light-separating property of the cholesteric liquid crystal, the projection screen not reflect nearly half of the environmental light incident on the screen.

However, in the projection screen described in Patent Document 1, since the cholesteric liquid crystal is in the sate of planar orientation and causes specular reflection when reflects light, it is difficult to recognize the reflected light as an image. Namely, in order to recognize the reflected light as an image, the reflected light is needed to have been diffused, but this point is not taken into account in the projection screen described in Patent Document 1.

On the other hand, Patent Document 2 describes a projection screen using, as a reflective polarization element, a multi-layered reflective polarizer or the like having diffusing properties. This projection screen does not reflect part of the environmental light incident on it because of the polarized-light-separating property of the multi-layered reflective polarizer or the like, and diffuses the reflected light by interfacial reflection that occurs at an interface between materials having different refractive indices, constituting the multi-layered reflective polarizer, or by means of a diffusing element that is provided separately from the multi-layered reflective polarizer. Patent Document 2 also describes a projection screen using a cholesteric, reflective polarizer or the like as a reflective polarization element in combination with a diffusing element. This projection screen does not reflect part of the environmental light incident on it because of the polarized-light-separating property of the cholesteric, reflective polarizer or the like, and diffuses the reflected light by means of the diffusing element that is provided separately from the cholesteric, reflective polarizer.

Namely, in the projection screens described in Patent Document 2, only a specific polarized component of the imaging light projected from a projector is selectively reflected by making use of the so-called polarized-light-separating property in order to sharply produce an image, and, moreover, the imaging light reflected is diffused in order to improve image visibility.

The polarized-light-separating layers for use in the projection screens described in Patent Documents 1 and 2, however, are made of organic films containing cholesteric liquid crystals and so forth and therefore contain molecules of liquid crystals that are organic compounds. Such liquid crystalline molecules have a marked tendency to absorb light in a wave range extending on the shorter wavelength side, so that they excessively absorb light in the blue (B) color wave range, which extends, of the wave ranges of light of the three primary colors, on the shortest wavelength side, if imaging light (containing light in the wave ranges for red (R), green (G) and blue (B) colors, the three primary colors of light) is emitted from a conventional projector. For this reason, the projection screens described in Patent Documents 1 and 2 show decreased efficiency of reflection of light in the blue (B) color wave range contained in the imaging light projected; these projection screens provide lowered image visibility because they cannot sharply display blue color.

SUMMARY OF THE INVENTION

The present invention has been accomplished in the light of the above-described problem. An object of the present invention is, therefore, to provide a projection screen capable of sharply displaying an image even under bright environmental light and of providing improved image visibility, and a projection system comprising such a projection screen.

A projection screen of the present invention, for displaying an image by reflecting imaging light that is projected from the observation side, comprises a polarized-light selective reflection layer that selectively reflects a specific polarized-light component, wherein the polarized-light selective reflection layer comprises two or more partial selective reflection layers made of organic films, layered one over another, and, of these partial selective reflection layers, a first partial selective reflection layer for reflecting light in a wave range for a color that is most readily absorbed by an organic film is arranged as the outermost layer on the observation side.

In the above-described projection screen according to the present invention, it is preferable that the polarized-light selective reflection layer selectively reflects light in a specific wave range that covers only part of the visible region.

Further, in the above-described projection screen according to the present invention, it is preferable that the two or more partial selective reflection layers comprise a second partial selective reflection layer having a selective reflection wave range that extends on the longer wavelength side than the selective reflection wave range of the first partial selective reflection layer does, and a third partial selective reflection layer having a selective reflection wave range that extends on the longer wavelength side than the selective reflection wave range of the second partial selective reflection layer does, and that the first, the second, and the third partial selective reflection layers are layered in this order, the first partial selective reflection layer being on the observation side. Besides this order, the partial selective reflection layers may be layered in the order of the first, the third, and the second partial selective reflection layers, the first partial selective reflection layer being on the observation side. It is herein preferable that the second and the third partial selective reflection layers be integrated. In addition, it is preferable that the first, the second, and the third partial selective reflection layers selectively reflect light in wave ranges with center wavelengths that fall in the ranges of 430–460 nm, 540–570 nm and 580–620 nm, respectively, assuming that light enters the polarized-light selective reflection layer vertically to it.

Furthermore, in the above-described projection screen according to the present invention, it is preferable that the specific polarized-light component be right- or left-handed circularly polarized light. The specific polarized-light component may also be linearly polarized light of one vibration direction.

Furthermore, it is preferable that the above-described projection screen of the present invention further comprises a diffusing element that diffuses light that is reflected from the partial selective reflection layers in the polarized-light selective reflection layer, or that the partial selective reflection layers themselves in the polarized-light selective reflection layer have a diffusing property.

Furthermore, in the above-described projection screen according to the present invention, it is preferable that each of the partial selective reflection layers in the polarized-light selective reflection layer has a cholesteric liquid crystalline structure, and, owing to structural non-uniformity in the cholesteric liquid crystalline structure, diffuses the specific polarized-light component. In this case, it is preferable that the cholesteric liquid crystalline structure of each of the partial selective reflection layers comprises a plurality of helical structure parts that are different in the direction of helical axis. Preferably, the cholesteric liquid crystalline structures of the partial selective reflection layers in the polarized-light selective reflection layer have different helical pitches.

Furthermore, it is preferable that the above-described projection screen of the present invention further comprises a substrate that supports the polarized-light selective reflection layer. In this case, the substrate may be an absorptive substrate comprising a light-absorbing layer adapted to absorb light in the visible region, or a transparent substrate adapted to transmit at least part of light in the visible region.

Furthermore, in the above-described projection screen according to the present invention, it is preferable that the polarized-light selective reflection layer comprises an intermediate layer having a barrier or adhesion property, provided between each neighboring two of the partial selective reflection layers.

Furthermore, it is preferable that the above-described projection screen of the present invention further comprises a functional layer containing at least one layer selected from the group consisting of a hard coat layer, an anti-glaring layer, an anti-reflection layer, an ultraviolet-light-absorbing layer, and an antistatic layer. It is herein preferable that the functional layer be an anti-glaring layer and that the anti-glaring layer be made of a layer with an irregularly roughened surface, isotropic with respect to refractive index. For example, a TAC film with a matte surface is conveniently used as the anti-glaring layer. Alternatively, the surface of the polarized-light selective reflection layer on which imaging light is projected may be provided with irregularities, by which an anti-glaring property is imparted to the polarized-light selective reflection layer.

A projection system according to the present invention comprises the above-described projection screen of the present invention, and a projector that projects imaging light on the projection screen.

According to the present invention, (1) the polarized-light selective reflection layer for selectively reflecting a specific polarized-light component comprises two or more partial selective reflection layers made of organic films, layered one over another, and, of these partial selective reflection layers, a first partial selective reflection layer for reflecting light in a wave range for a color that is most readily absorbed by an organic film is arranged as the outermost layer on the observation side. Therefore, light in a wave range extending on the shorter wavelength side that is most readily absorbed (or diffused) by an organic film (light in the blue (B) color wave range, which extends, of the wave ranges of light of the three primary colors, on the shortest wavelength side, if imaging light is light emitted from a conventional projector) is reflected from the first partial selective reflection layer arranged as the outermost layer on the observation side, so that this light is never influenced (absorbed or diffused by the organic films) by any of the other partial selective reflection layers (e.g., the partial selective reflection layer for reflecting light in the green (G) or red (R) color wave range). For this reason, the efficiency of reflection of light in a wave range extending on the shorter wavelength side (e.g., the blue (B) color wave range) that is most readily absorbed (or diffused) by an organic film is effectively increased. Consequently, while enhancing image contrast by suppressing the influence of environmental light such as sunlight and light from lighting fixtures by making use of the polarized-light-separating property of the polarized-light selective reflection layer, it is possible to increase the sharpness of, for example, blue (B) color whose visibility tends to lower, thereby improving image visibility.

(2) By forming the polarized-light selective reflection layer so that it selectively reflects light in a specific wave range that covers only part of the visible region, it is possible to further suppress the influence of environmental light such as sunlight and light from lighting fixtures, thereby enhancing image contrast. Image visibility can thus be further improved.

(3) The two or more partial selective reflection layers in the polarized-light selective reflection layer are layered in the order of the first partial selective reflection layer, the second partial selective reflection layer (a partial selective reflection layer having a selective reflection wave range that extends on the longer wavelength side than the selective reflection wave range of the first partial selective reflection layer does) and the third partial selective reflection layer (a partial selective reflection layer having a selective reflection wave range that extends on the longer wavelength side than the selective reflection wave range of the second partial selective reflection layer does), the first partial selective reflection layer being on the observation side. Alternatively, the partial selective reflection layers may be layered in the order of the first, the third, and the second partial selective reflection layers, the first partial selective reflection layer being on the observation side. In either case, since light in a wave range (e.g., the blue (B) color wave range) extending on the shorter wavelength side that is most readily absorbed (or diffused) by an organic film is never absorbed or diffused by the other partial selective reflection layers (the second and the third partial selective reflection layers) before it is reflected from the first partial selective reflection layer, the efficiency of reflection of this light is effectively enhanced, and image visibility can thus be improved.

(4) By integrally forming the second and the third partial selective reflection layers in the polarized-light selective reflection layer, it is possible to reflect, by one partial selective reflection layer, light in the wave ranges for green (G) and red (R) of the three primary colors. White color can therefore be produced by a simpler construction.

(5) Further, by forming the first, the second, and the third partial selective reflection layers in the polarized-light selective reflection layer so that they selectively reflect light in wave ranges with center wavelengths that fall in the ranges of 430–460 nm, 540–570 nm, and 580–620 nm, respectively, assuming that light enters the polarized-light selective reflection layer vertically to it, it is possible to make the wave range of light which the projection screen selectively reflects identical with the wave range of imaging light which a projector projects on the projection screen. It is therefore possible to enhance image contrast by further suppressing the influence of environmental light such as sunlight and light from lighting fixtures, thereby further improving image visibility.

(6) The polarized-light selective reflection layer herein selectively reflects only a specific polarized-light component (for example, right-handed circularly polarized light, if the specific polarized-light component is either right- or left-handed circularly polarized light) owing to its polarized-light-separating property. It is, therefore, possible to make the polarized-light selective reflection layer reflect only approximately 50% of the unpolarized environmental light, such as sunlight and light from lighting fixtures, incident on this layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the polarized-light component which the polarized-light selective reflection layer selectively reflects (e.g., right-handed circularly polarized light), the polarized-light selective reflection layer can reflect nearly 100% of the imaging light projected, that is, the polarized-light selective reflection layer can efficiently reflect the imaging light. Even a projector that emits linearly polarized light, such as a liquid crystal projector, can be used, regardless of the direction of linear polarization, for projecting imaging light on the projection screen if a retardation layer or the like for converting linearly polarized light into circularly polarized light is used.

(7) The specific polarized-light component which the polarized-light selective reflection layer selectively reflects may also be a linearly polarized light of one vibration direction (P- or S-polarized light). Also in this case, the polarized-light selective reflection layer selectively reflects only a specific polarized-light component (e.g., P-polarized light) owing to its polarized-light-separating property. It is, therefore, possible to make the polarized-light selective reflection layer reflect only approximately 50% of the unpolarized environmental light, such as sunlight and light from lighting fixtures, incident on this layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the polarized-light component which the polarized-light selective reflection layer selectively reflects (e.g., P-polarized light), the polarized-light selective reflection layer can reflect nearly 100% of the imaging light projected, that is, the polarized-light selective reflection layer can efficiently reflect the imaging light. In the case where the specific polarized-light component which the polarized-light selective reflection layer selectively reflects is a linearly polarized light of one vibration direction, the projection screen can brightly display an image if the direction of linear polarization of light emitted from a projector is made identical with the direction of linear polarization of light which the polarized-light selective reflection layer diffuse-reflects.

(8) If the projection screen is made to contain, in addition to the polarized-light selective reflection layer, a diffusing element for diffusing light reflected from the partial selective reflection layers in the polarized-light selective reflection layer, the imaging light reflected is diffused, so that improved image visibility can be obtained. In this case, since a polarized-light-separating property and a diffusing property can be made independent of each other, it is possible to easily control these two properties.

(9) Alternatively, the polarized-light selective reflection layer itself may have diffusing properties. In this case, since the state of polarization of light incident on the polarized-light selective reflection layer is not disturbed, high reflection intensity can be obtained. Specifically, in the case where a diffusing element that cannot maintain the state of polarization of incident light is provided on the observation side of a reflective polarization element, light passes through the diffusing element before it enters the reflective polarization element, and the state of polarization of the light is disturbed (this is called "depolarization"). In this case, the light that passes through the diffusing element includes two types of light, environmental light (sunlight, etc.) and imaging light. When the state of polarization of environmental light is disturbed by the diffusing element, the light which the reflective polarization element inherently transmits is, owing to depolarization, converted into a light component which the reflective polarization element reflects, and is reflected from the reflective polarization element as unnecessary light. On the other hand, when the state of polarization of imaging light is disturbed by the diffusing element, the light which the reflective polarization element inherently reflects is, owing to depolarization, converted into a light component which the reflective polarization element does not reflect, and passes through the reflective polarization element. Because of these two phenomena, the original polarized-light-separating property is impaired, and image visibility cannot fully be improved. However, if the polarized-light selective reflection layer itself has diffusing properties, the above-described "depolarization" does not occur. It is, therefore, possible to improve image visibility while maintaining the polarized-light-separating property inherent in the polarized-light selective reflection layer.

(10) Preferably, the polarized-light selective reflection layer has a cholesteric liquid crystalline structure, and, owing to structural non-uniformity in the cholesteric liquid crystalline structure, diffuses a specific polarized-light component. In this case, since environmental light and imaging light that pass through the polarized-light selective reflection layer do not undergo the above-described "depolarization", it is possible to improve image visibility while retaining the original polarized-light-separating property of the polarized-light selective reflection layer. Specifically, in the polarized-light selective reflection layer, if its cholesteric liquid crystalline structure is structurally non-uniform because, for example, the helical structure parts of the cholesteric liquid crystalline structure have helical axes extending in different directions, the polarized-light selective reflection layer reflects imaging light not by specular reflection but by diffuse reflection, and the reflected light can thus be readily recognized as an image. At this time, owing to structural non-uniformity in the cholesteric liquid crystalline structure, the polarized-light selective reflection layer diffuses light that is selectively reflected. Therefore, the polarized-light selective reflection layer can reflect a specific polarized-light component while diffusing it, and, at the same time, transmit the other light components without diffusing them.

(11) In the case where the partial selective reflection layers in the polarized-light selective reflection layer have cholesteric liquid crystalline structures, if the helical pitches in the cholesteric liquid crystalline structures are made different, the selective reflection wave ranges of the partial selective reflection layers can be set to, for example, the wave ranges of light of red (R), green (G), and blue (B) colors, the three primary colors.

(12) Furthermore, a projection system comprising the above-described projection screen and a projector for projecting imaging light on the projection screen can be herein used. In this case, it is possible to enhance image contrast by suppressing the influence of environmental light such as sunlight and light from lighting fixtures by making use of the polarized-light-separating property of the polarized-light selective reflection layer in the projection screen, and, at the same time, to diffuse the imaging light that is reflected, without lowering image visibility, by making use of, for example, structural non-uniformity in the cholesteric liquid crystalline structure of the polarized-light selective reflection layer. Moreover, in the polarized-light selective reflection layer comprising two or more partial selective reflection layers made of organic films, layered one over another, the first partial selective reflection layer for reflecting light in a wave range for a color that is most readily absorbed by an organic film is arranged as the outermost layer on the observation side. It is, therefore, possible to effectively increase the efficiency of reflection of light in a wave range (e.g., the blue (B) color wave range) extending on the shorter wavelength side that is most readily absorbed (or diffused) by an organic film, thereby enhancing the sharpness of, for example, blue (B) color whose visibility tends to lower. Image visibility can thus be improved.

DETAILED DESCRIPTION OF PREFERRED EMBODIMENTS

By referring to the accompanying drawings, embodiments of the present invention will be described hereinafter.

Projection Screen

First of all, a projection screen according to an embodiment of the present invention will be described with reference to FIG. 1.

Figure 1:
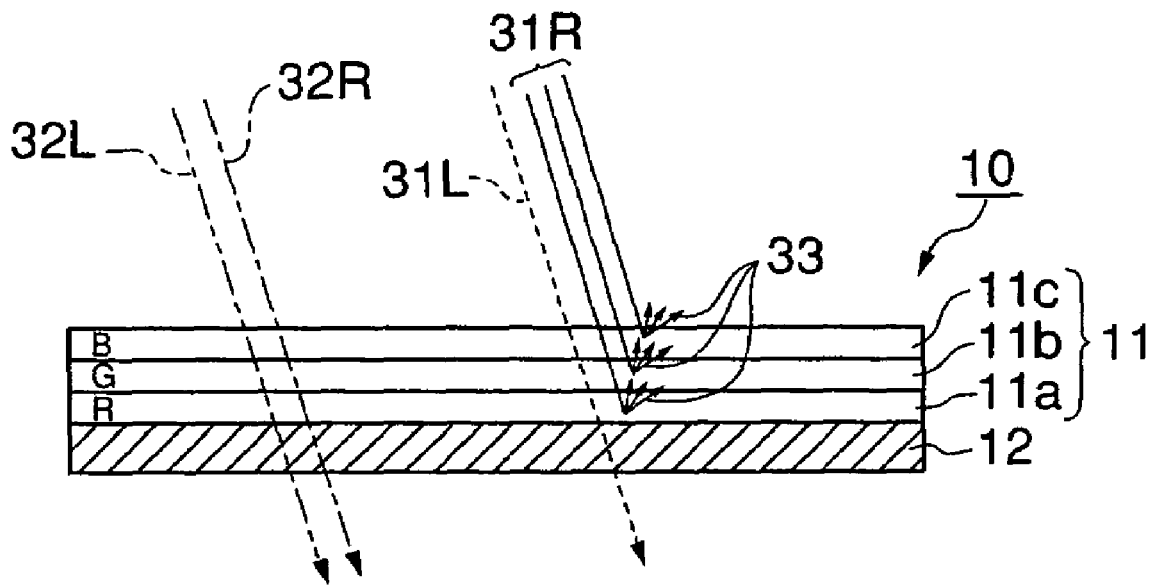
FIG. 1 is a diagrammatic sectional view of a projection screen according to an embodiment of the present invention.

As shown in FIG. 1, a projection screen 10 according to this embodiment is for displaying an image by reflecting imaging light projected from the observation side (the upper side of the figure). The projection screen 10 comprises a cholesteric liquid crystalline, polarized-light selective reflection layer 11 for selectively diffuse-reflecting a specific polarized-light component, and a substrate 12 for supporting the polarized-light selective reflection layer 11.

The polarized-light selective reflection layer 11 comprises three partial selective reflection layers 11a, 11b and 11c that are layered one over another, and each partial selective reflection layer 11a, 11b, 11c has a cholesteric liquid crystalline structure that causes selective diffuse-reflection of a specific polarized-light component.

Each partial selective reflection layer 11a, 11b, 11c is made from a cholesteric, liquid crystalline composition, and physically, liquid crystalline molecules in this layer are aligned in helical fashion in which the directors of the liquid crystalline molecules are continuously rotated in the direction of the thickness of the layer.

Owing to such a physical alignment of the liquid crystalline molecules, each partial selective reflection layer 11a, 11b, 11c has the polarized-light-separating property, the property of separating a light component circularly polarized in one direction from a light component circularly polarized in the opposite direction. Namely, each partial selective reflection layer 11a, 11b, 11c converts unpolarized light that enters the layer along the helical axis into light in two different states of polarization (right-handed circularly polarized light and left-handed circularly polarized light), and transmits one of these light and reflects the other. This phenomenon is known as circular dichroism. If the direction of rotation of liquid crystalline molecular helix is properly selected, a light component circularly polarized in the same direction as this direction of rotation is selectively reflected.

In this case, the diffusion of polarized light is maximized at the wavelength $\lambda_o$ given by the following equation (1):

$$\lambda_o = nav \cdot p, \tag{1}$$

where p is the helical pitch in the helical structure consisting of liquid crystalline molecules (the length of one liquid crystalline molecular helix), and nav is the mean refractive index on a plane perpendicular to the helical axis.

On the other hand, the width $\Delta\lambda$ of the wavelength band of reflected light is given by the following equation (2):

$$\Delta\lambda = \Delta n \cdot p, \tag{2}$$

where $\Delta n$ is the birefringence value.

Namely, as shown in FIG. 1, of the unpolarized light that has entered the projection screen 10 from the observation side (right-handed circularly polarized light 31R and left-handed circularly polarized light 31L in the selective reflection wave range, and right-handed circularly polarized light 32R and left-handed circularly polarized light 32L not in the selective reflection wave range), one of the circularly polarized-light components (e.g., right-handed circularly polarized light 31R in the selective reflection wave range) in the wavelength band (selective reflection wave range) with the width $\Delta\lambda$, extending around the selective reflection center wavelength $\lambda_o$, is reflected from the projection screen 10 as reflected light 33, and the other light (e.g., left-handed circularly polarized light 31L in the selective reflection wave range, and right-handed circularly polarized light 32R and left-handed circularly polarized light 32L not in the selective reflection wave range) pass through the projection screen 10, owing to the above-described polarized-light-separating property.

Figure 2A:
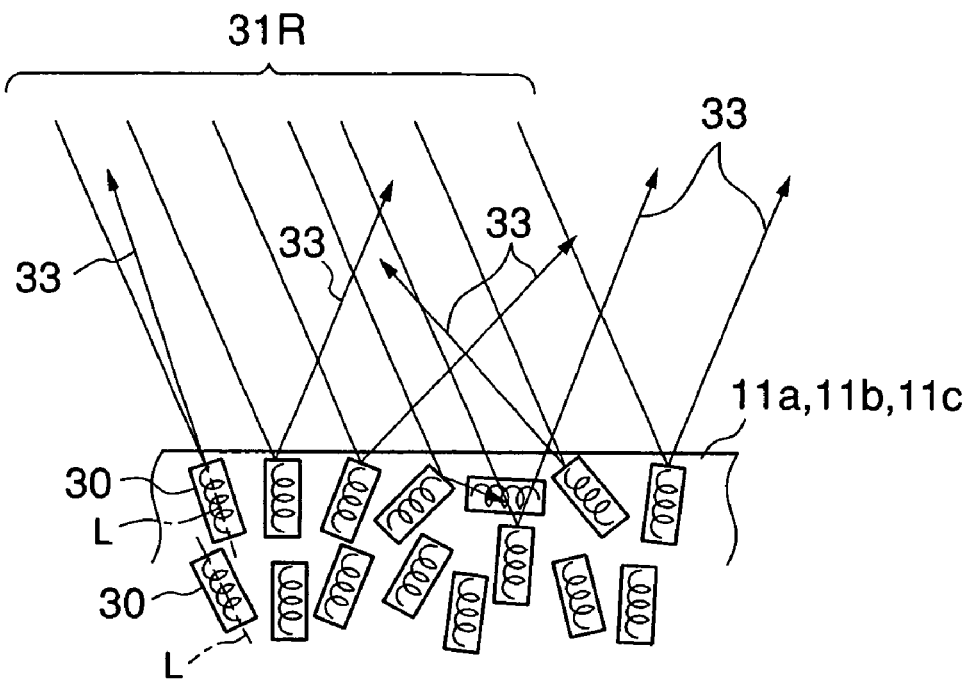
FIGS. 2A and 2B are illustrations for explaining the state of orientation of and the optical function of the polarized-light selective reflection layer of the projection screen shown in FIG. 1.

The cholesteric liquid crystalline structure of each partial selective reflection layer 11a, 11b, 11c comprises a plurality of helical structure parts 30 that are different in the direction of helical axis L, as shown in FIG. 2A. Owing to structural non-uniformity in such a cholesteric liquid crystalline structure, the polarized-light selective reflection layer 11 diffuses light that is selectively reflected (reflected light 33). The state in which the cholesteric liquid crystalline structure is structurally non-uniform herein includes: the state in which the helical structure parts 30 of the cholesteric liquid crystalline structure are different in the direction of helical axis L; the state in which at least some of the planes of nematic layers (the planes on which the directors of liquid crystalline molecules point in the same X-Y direction) are not parallel to the plane of the polarized-light selective reflection layer 11 (the state in which, in a sectional TEM photo of a cholesteric liquid crystalline structure specimen that has been stained, continuous curves that appear as light-and-dark patterns are not parallel to the substrate plane); and the state in which finely divided particles of a cholesteric liquid crystal are dispersed in the cholesteric liquid crystalline structure as a pigment. The "diffusion" that is caused by such structural non-uniformity in the cholesteric liquid crystalline structure means that the light (imaging light) reflected from the projection screen 10 is spread or diffused to such an extent that viewers can recognize the reflected light as an image.

Figure 2B:
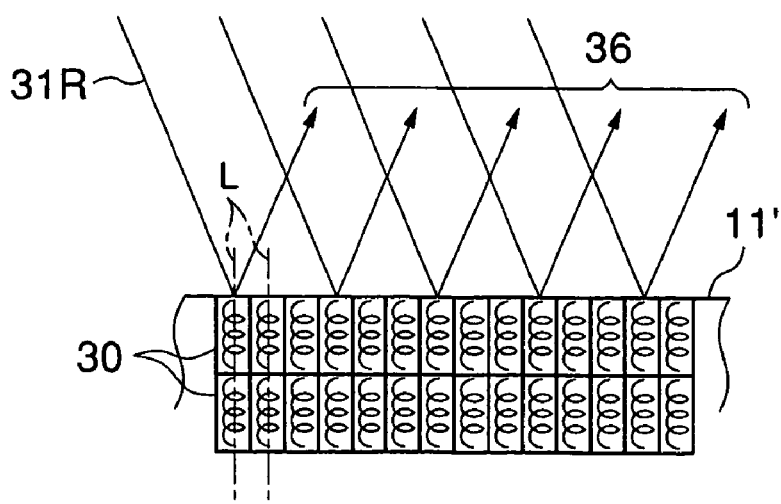

On the contrary, a conventional cholesteric liquid crystalline structure is in the state of planar orientation, and the helical axes L of helical structure parts 30 of the cholesteric liquid crystalline structure extend in parallel in the direction of the thickness of the layer, like in a polarized-light selective reflection layer 11' shown in FIG. 2B. Such a cholesteric liquid crystalline structure causes specular reflection when reflects light that is selectively reflected (reflected light 36).

It is preferable that the helical structure parts 30 of the cholesteric liquid crystalline structure of each partial selective reflection layer 11a, 11b, 11c in the polarized-light selective reflection layer 11 has a specific helical pitch so that the polarized-light selective reflection layer 11 selectively reflects light in a specific wave range that covers only a part of the visible region (e.g., the wave range of 400 to 700 nm). More specifically, it is preferable that the cholesteric liquid crystalline structures of the partial selective reflection layers 11a, 11b and 11c in the polarized-light selective reflection layer 11 have at least two discontinuously varied helical pitches so that the polarized-light selective reflection layer 11 selectively reflects only light in a wave range identical with the wave range of imaging light projected from a projector such as a liquid crystal projector.

Figure 3:
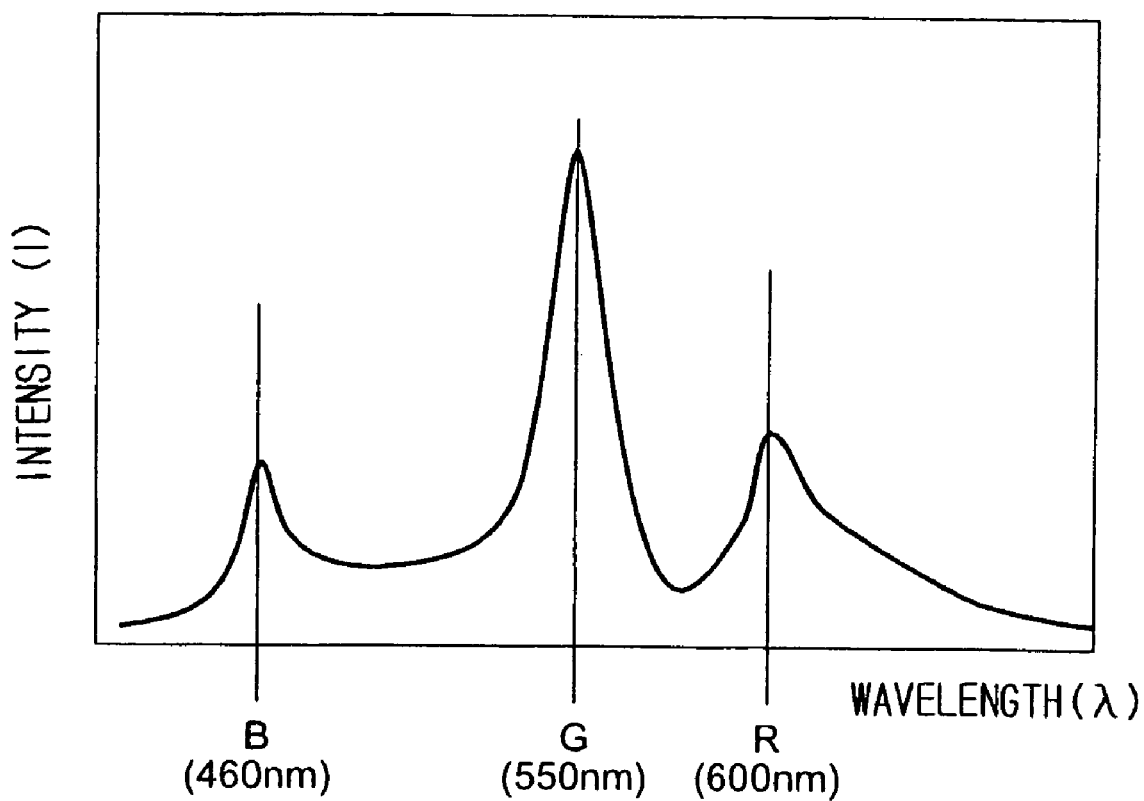
FIG. 3 is a diagram showing the wavelength-dependent dispersion of imaging light emitted from a projector.

FIG. 3 is a diagram showing the wavelength-dependent dispersion of imaging light emitted from a projector. FIG. 3 plots wavelength (λ) as the abscissa and strength (I) as the ordinate.

A projector usually attains color display by light in the wave ranges for red (R), green (G), and blue (B) colors, the three primary colors of light. Therefore, assuming that light enters the polarized-light selective reflection layer 11 vertically to it, it is preferable to decide the helical pitches in the cholesteric liquid crystalline structures so that the polarized-light selective reflection layer 11 selectively reflects light in wave ranges with center wavelengths that fall in the ranges of 430–460 nm, 540–570 nm, and 580–620 nm.

The wave ranges of 430 to 460 nm, 540 to 570 nm, and 580 to 620 nm are commonly used as the red (R), green (G), and blue (B) color wave ranges, respectively, for color filters, light sources, etc. for use in displays that produce white color by the three primary colors of light. As shown in FIG. 3, red (R), green (G), and blue (B) colors are given as line spectra that peak at specific wavelengths (e.g., in the case of blue (B), this wavelength is typically 460 nm; in the case of green (G), typically 550 nm; and in the case of red (R), typically 600 nm). These line spectra have certain widths, and, moreover, the projected light has wavelengths that vary depending upon the design of the projector, the type of the light source, and the like. It is, therefore, preferable that the wavelength band for each color has a width of 30 to 40 nm. If the red (R), green (G), and blue (B) color wave ranges are set outside the above-described respective ranges, pure white cannot be obtained, and only white with a yellow or red tint is unfavorably obtained.

In the case where the cholesteric liquid crystalline structures of the partial selective reflection layers 11a, 11b and 11c in the polarized-light selective reflection layer 11 have two or more discontinuously varied helical pitches, the helical pitches in the cholesteric liquid crystalline structures of the partial selective reflection layers 11a, 11b and 11c may be decided so that the polarized-light selective reflection layer 11 selectively reflects light in the wave ranges with center wavelengths that fall in the ranges of 430–460 nm, 540–570 nm and 580–620 nm (light of the three primary colors), assuming that light enters the polarized-light selective reflection layer 11 vertically to it.

Figure 4:
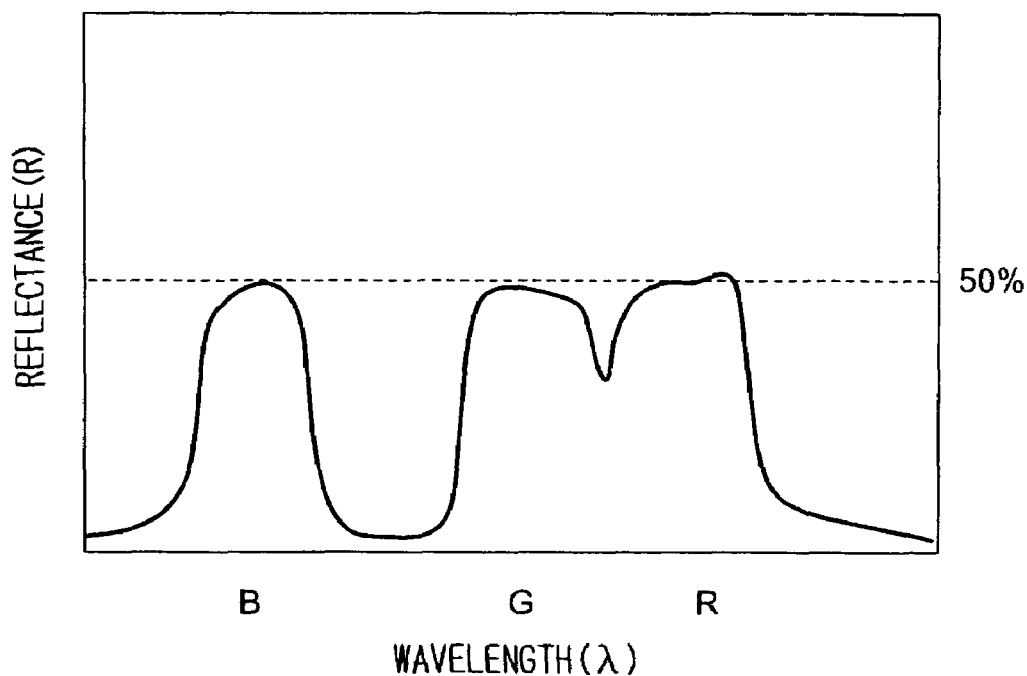
FIG. 4 is a diagram showing a reflection band which a polarized-light selective reflection layer produces (showing the case where the wave ranges of light of the three primary colors are independent)

The polarized-light selective reflection layer 11 may produce any reflection band, and a possible reflection band is that the wave ranges for red (R), green (G), and blue (B) colors, the three primary colors of light, are given as independent selective reflection wave ranges, as shown in FIG. 4. FIG. 4 plots wavelength (λ) as the abscissa and reflectance (R) as the ordinate.

In this case, it is preferable that the cholesteric liquid crystalline structure of the polarized-light selective reflection layer 11 has three discontinuously varied helical pitches. For example, the polarized-light selective reflection layer 11 may be made to produce a reflection band consisting of three sections corresponding to the wave ranges for red (R), green (G), and blue (B) colors, the three primary colors of light. Specifically, it is preferable that the polarized-light selective reflection layer 11 comprises, as shown in FIG. 1, a partial selective reflection layer 11c for selectively reflecting light in the blue (B) color wave range, a partial selective reflection layer 11b for selectively reflecting light in the green (G) color wave range, and a partial selective reflection layer 11a for selectively reflecting light in the red (R) color wave range.

In the polarized-light selective reflection layer 11, the partial selective reflection layer 11c, the partial selective reflection layer 11b, and the partial selective reflection layer 11a are, as shown in FIG. 1, layered over the substrate 12 in this order, the partial selective reflection layer 11c being on the observation side. Namely, the partial selective reflection layer 11c for selectively reflecting light in the blue (B) color wave range is arranged as the outermost layer on the observation side.

Each partial selective reflection layer 11a, 11b, 11c in the polarized-light selective reflection layer 11 has, as mentioned above, a cholesteric liquid crystalline structure consisting of liquid crystalline molecules and is formed, as a whole, an organic film. The liquid crystalline molecules are those of an organic compound and have the property of absorbing (or diffusing) light in a wave range extending on the shorter wavelength side of the visible region (e.g., the wave range of 4.00 to 700 nm).

Further, in the case where the partial selective reflection layers 11a, 11b and 11c in the polarized-light selective reflection layer 11 are formed by ultraviolet-light polymerization, the polymerized partial selective reflection layers 11a, 11b and 11c have the property of absorbing ultraviolet light or light in a wave range extending near the ultraviolet region.

Of the light of the three primary colors, blue (B) light has a wave range that extends on the shorter wavelength side and nearer the ultraviolet region than do the wave ranges of light of the other colors (light in the green (G) and red (R) color wave ranges).

Therefore, of the light of the three primary colors, blue (B) light is most readily absorbed (or diffused) by the partial selective reflection layers 11a, 11b and 11c made of organic films, contained in the polarized-light selective reflection layer 11. If light in the blue (B) color wave range is excessively absorbed (or diffused) by liquid crystalline molecules and so on present in the polarized-light selective reflection layer 11, the efficiency of reflection of light in the blue (B) color wave range decreases, and the sharpness of this light thus lowers, resulting in decrease in image visibility. For this reason, in the projection screen 10 comprising such a polarized-light selective reflection layer 11, it is important in improving image visibility to increase the efficiency of reflection of light in the blue (B) color wave range with consideration for the characteristic nature of liquid crystalline molecules and so on to be contained in the partial selective reflection layers 11a, 11b and 11c.

In this embodiment, the partial selective reflection layer 11c for selectively reflecting light in the blue (B) color wave range, the partial selective reflection layer 11b for selectively reflecting light in the green (G) color wave range, and the partial selective reflection layer 11a for selectively reflecting light in the red (R) color wave range are, as mentioned above, layered in this order, the partial selective reflection layer 11c being on the observation side, and owing to such a layered structure, the polarized-light selective reflection layer 11 reflects, at increased efficiency, light in the blue (B) color wave range, which is, of the light of the three primary colors, most readily absorbed (or diffused) by an organic film. The principle of this will be described below.

Now, let us consider the case where on the observation side of the partial selective reflection layer 11c for selectively reflecting light in the blue (B) color wave range are arranged the other partial selective reflection layers (the partial selective reflection layer 11a for selectively reflecting light in the red (R) color wave range and/or the partial selective reflection layer 11b for selectively reflecting light in the green (G) color wave range). In this case, light in the blue (B) color wave range passes through the partial selective reflection layers 11a and 11b before it reaches the partial selective reflection layer 11c, and is absorbed (or diffused) by liquid crystalline molecules contained in these layers while passing through them, so that the amount of this blue light is decreased before the light reaches the partial selective reflection layer 11c. For this reason, light in the blue (B) color wave range is reflected at decreased efficiency.

On the contrary, when the partial selective reflection layer 11c for selectively reflecting light in the blue (B) color wave range is arranged as the outermost layer on the observation side, light in the blue (B) color wave range is not influenced (absorbed or diffused by liquid crystalline molecules contained in the organic films) by the other partial selective reflection layers (the partial selective reflection layer 11a for selectively reflecting light in the red (R) color wave range and/or the partial selective reflection layer 11b for selectively reflecting light in the green (G) color wave range). Moreover, since light in the blue (B) color wave range passes through the polarized-light selective reflection layer 11 in a short time, it is not diffused so much as light in the green (G) and red (R) color wave ranges are. Therefore, the state of polarization of light in the wave range for blue (B) color is not disturbed, and the efficiency of reflection of this light is not decreased. (In general, unlike a layer made of an inorganic film, a layer made of an organic film inevitably has a certain thickness, so that it tends to diffuse light.) For this reason, the polarized-light selective reflection layer 11 can reflect, at increased efficiency, light in the blue (B) color wave range, which is, of the light of the three primary colors, most readily absorbed (or diffused) by an organic film, and can thus provide improved image visibility.

In this embodiment, not only the partial selective reflection layer 11c for selectively reflecting light in the blue (B) color wave range is arranged as the outermost layer on the observation side, but also the partial selective reflection layer 11c for selectively reflecting light in the blue (B) color wave range, the partial selective reflection layer 11b for selectively reflecting light in the green (G) color wave range, and the partial selective reflection layer 11a for selectively reflecting light in the red (R) color wave range are layered in this order. In such a layered structure, a partial selective reflection layer situated nearer the observation side selectively reflects light in a wave range that is more readily absorbed (or diffused) by liquid crystalline molecules contained in an organic film. It is, therefore, possible to make the polarized-light selective reflection layer 11 properly reflect not only light in the blue (B) color wave range, which is, of the light of the three primary colors, most readily absorbed (or diffused) by liquid crystalline molecules contained in an organic film, but also light in the other wave ranges, with consideration for the degree of absorption (or diffusion) of the light. Specifically, light in the blue (B) color wave range, which is, of the light of the three primary colors, most readily absorbed (or diffused) by liquid crystalline molecules, is reflected from the partial selective reflection layer 11c without being influenced by the other partial selective reflection layers. Further, light in the green (G) color wave range, which is, of the light of the three primary colors, second most readily absorbed (or diffused) by liquid crystalline molecules, is influenced only by the partial selective reflection layer 11c (single layer) and is selectively reflected from the partial selective reflection layer 11b. Similarly, light in the red (R) color wave range, which is, of the light of the three primary colors, most scarcely absorbed (or diffused) by liquid crystalline molecules, is influenced by the other partial selective reflection layers 11c, 11b (two layers) and is selectively reflected from the partial selective reflection layer 11a.

Therefore, in the polarized-light selective reflection layer 11 having a layered structure in which the partial selective reflection layers 11c, 11b and 11a are layered in this order, the partial selective reflection layer 11c being on the observation side, the absorption (or diffusion) of light of the three primary colors by liquid crystalline molecules becomes nearly uniform, so that the polarized-light selective reflection layer 11 can provide improved image visibility.

In the polarized-light selective reflection layer 11 shown in FIG. 1, the partial selective reflection layers 11c, 11b and 11a are layered over the substrate 12 in this order, the partial selective reflection layer 11c being on the observation side. However, as long as the partial selective reflection layer 11c is arranged as the outermost layer on the observation side in order to obtain improved efficiency of reflection of light in the blue (B) color wave range, the order in which the partial selective reflection layers are layered is not necessarily limited to the above-described one, and the partial selective reflection layers 11c, 11a and 11b may be layered over the substrate 12 in this order. In this case, light in the green (G) color wave range, which is, of the light of the three primary colors, second most readily absorbed (or diffused) by liquid crystalline molecules, is influenced by the partial selective reflection layers 11c and 11a (two layers), so that it is not easy for liquid crystalline molecules to uniformly absorb (or diffuse) light of the three primary colors. However, of the light of the three primary colors, green (G) light has the highest visibility, so that decrease in image visibility (especially brightness) is minimized. Image visibility can thus be kept relatively high.

Figure 6:
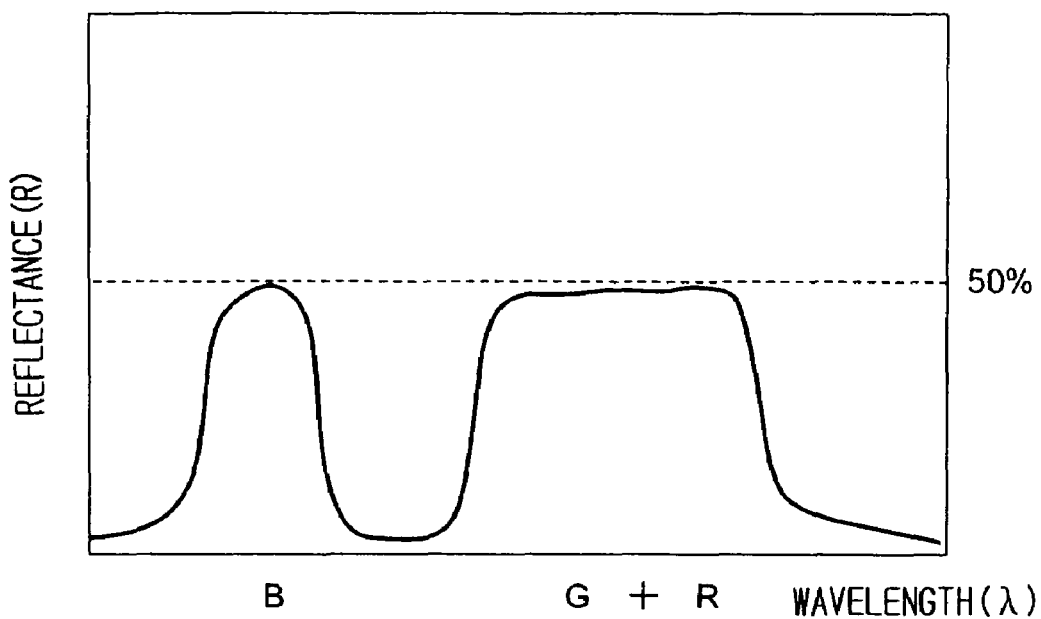
FIG. 6 is a diagram showing another reflection band which a polarized-light selective reflection layer produces (showing the case where the wave ranges of light of the three primary colors are not independent)

Explanation has been given with reference to the case where the reflection band which the polarized-light selective reflection layer 11 produces is as is shown in FIG. 4 (the case where the wave ranges for red (R), green (G) and blue (B) colors, the three primary colors, are given as independent selective reflection wave ranges). The reflection band which the polarized-light selective reflection layer 11 produces is not limited to this, and may also be one which the wave ranges for red (R), green (G) and blue (B) colors, the three primary colors, are given as selective reflection wave ranges that are not independent, as shown in FIG. 6. Namely, in the reflection band shown in FIG. 6 which the polarized-light selective reflection layer 11 produces, the wave ranges for green (G) and red (R) of the three primary colors extend within the width of a wavelength band included in a selective reflection wave range determined by one helical pitch. FIG. 6 plots wavelength ($\lambda$) as the abscissa and reflectance (R) as the ordinate.

Figure 7:
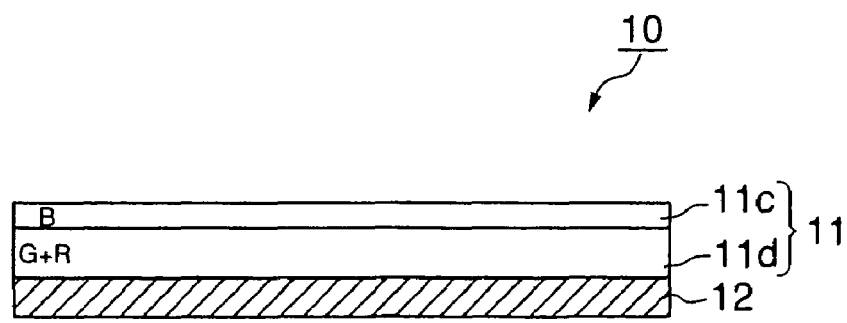
FIG. 7 is a diagrammatic sectional view showing another modification of the projection screen shown in FIG. 1.

In this case, it is preferable that the cholesteric liquid crystalline structure of the polarized-light selective reflection layer 11 has two discontinuously varied helical pitches. For example, the polarized-light selective reflection layer 11 may be made to produce a wavelength band consisting of two sections corresponding to the blue (B) color wave range and the green (G) and red (R) color wave ranges. Specifically, it is preferable that the polarized-light selective reflection layer 11 comprises, as shown in FIG. 7, the partial selective reflection layer 11c for selectively reflecting light in the blue (B) color wave range and a partial selective reflection layer 11d for selectively reflecting light in the green (G) and red (R) color wave ranges that are layered over the substrate 12 in this order, the partial selective reflection layer 11c being on the observation side.

In order that the polarized-light selective reflection layer 11d may selectively reflect light in the green (G) and red (R) color wave ranges, the width $\Delta\lambda$ of the wavelength band extending around the selective reflection center wavelength $\lambda_0$ given by the above equation (2) must be made large. As the above equation (2) shows, it is possible to increase the width $\Delta\lambda$ of the wavelength band extending around the selective reflection center wavelength $\lambda_0$ by incorporating a liquid crystalline composition having a great birefringence value $\Delta n$ (a liquid crystalline composition having a birefringence value $\Delta n$ of as great as approximately 0.3, for example, although this value $\Delta n$ is usually about 0.1). By doing so, there can be obtained the partial selective reflection layer 11d that is a single layer capable of selectively reflecting both light in the green (G) color wave range and light in the red (R) color wave range.

The width $\Delta\lambda$ of the wavelength band which the above-described partial selective reflection layer 11d produces will now be explained in a comparison with the widths $\Delta\lambda$ of the wavelength bands which the above-described partial selective reflection layers 11a and 11b produce.

The partial selective reflection layer 11b is for selectively reflecting light in the wave range for green (G) color. For example, when the selective reflection center wavelength $\lambda_o$ is 550 nm, the helical pitch p can be obtained from the above equation (1) as follows:

$p = \lambda_0 / nav = 550/1.55 = 355$ nm, where nav is the mean refractive index on a plane perpendicular to the helical axis, as mentioned previously, and is usually in the range of 1.5 to 1.6.

Therefore, the wavelength band width $\Delta\lambda_1$ obtainable from the above equation (2) is:

$\Delta\lambda_1 = \Delta n \cdot p = 0.1 \times 355 = 36$ nm where $\Delta n$ is the birefringence value as mentioned previously and is usually about 0.1.

When wider wave ranges are used as the green (G) and red (R) color wave ranges, since nav=1.55 to 1.65 and $\Delta n$=0.2 to 0.3, p and $\Delta\lambda_2$ obtainable from the above equations (1) and (2) are as follows:

$p = 550/1.6 = 344$ nm, and $\Delta\lambda_2 = 0.2 \times 344 = 69$ nm.

On the contrary, the partial selective reflection layer 11a is for selectively reflecting light in the wave range for red (R) color, and when the selective reflection center wavelength $\lambda_0$ is 600 nm, for example, $\Delta\lambda_1$ and $\Delta\lambda_2$ obtainable by the above-described method of calculation are as follows:

$\Delta\lambda_1 = 40$ nm, and $\Delta\lambda_2 = 76$ nm.

On the other hand, the partial selective reflection layer 11d is for selectively reflecting light in the green (G) and red (R) color wave ranges. Since the center wavelengths of the selective reflection wave ranges for light in the green (G) and red (R) color wave ranges are in the ranges of 540 to 570 nm and 580 to 620 nm, respectively, the center wavelength $\lambda_0$ of the selective reflection wave range of the partial selective reflection layer 11d falls in the range of 540 to 620 nm (band: 80 nm), for example. In this case, the width $\Delta\lambda$ of the wavelength band which the partial selective reflection layer 11d produces can be obtained by adding, to both ends of the above band (80 nm), the values $\Delta\lambda_1/2$ obtained by calculation carried out for the partial selective reflection layers 11a and 11b. Therefore, when the center wavelength $\lambda_0$ of the selective reflection wave range of the partial selective reflection layer 11d is in the range of 540 to 620 nm (band: 80 nm), the width $\Delta\lambda$ of the wavelength band the partial selective reflection layer 11d produces is as follows:

$\Delta\lambda = 36/2 + 80 + 40/2 = 118$ nm.

Further, when the center wavelength $\lambda_0$ of the selective reflection wave range of the partial selective reflection layer 1d is in the range of 550 to 600 nm (band: 50 nm), the width $\Delta\lambda$ of the wavelength band which the partial selective reflection layer 11d produces, obtainable by the same method of calculation, is as follows:

$\lambda = 36/2 + 50 + 40/2 = 88$ nm.

When a wider wave range is used for the green (G) and red (R) color wave ranges, the widths $\Delta\lambda$ of the wavelength bands which the partial selective reflection layer 11d produces, obtainable by the same method of calculation, are:

$\Delta\lambda = 69/2 + 80 + 76/2 = 153$ nm, and $\Delta\lambda = 69/2 + 50 + 76/2 = 123$ nm.

Also in the polarized-light selective reflection layer 11 shown in FIG. 7, the partial selective reflection layer 11c for selectively reflecting blue (B) light is arranged as the outermost layer on the observation side. It is, therefore, possible to effectively increase the efficiency of reflection of light in the blue (B) color wave range, which is, of the light of the three primary colors, most readily absorbed (or diffused) by liquid crystalline molecules, thereby improving image visibility. Further, since the polarized-light selective reflection layer 11 comprises, on the substrate 12 side, the partial selective reflection layer 11d for selectively reflecting light in the green (G) and red (R) color wave ranges, both light in the green (G) color wave range and light in the red (R) color wave range are selectively reflected from the single partial selective reflection layer 11d. For this reason, light in the green (G) and red (R) color wave ranges are selectively reflected from the partial selective reflection layer 11d with being influenced only by the partial selective reflection layer 11c (one layer).

It is preferable that the polarized-light selective reflection layer 11 (or each partial selective reflection layer 11a, 11b, 11c, 11d constituting the polarized-light selective reflection layer 11) be formed to have such a thickness that it can reflect approximately 100% of light in a specific state of polarization that is selectively reflected (such a thickness that the reflectance is saturated). This is because when the polarized-light selective reflection layer 11 has a reflectance of less than 100% for a specific polarized-light component that is selectively reflected (e.g., right-handed circularly polarized light), it cannot efficiently reflect imaging light. Although the reflectance of the polarized-light selective reflection layer 11 (or each partial selective reflection layer 11a, 11b, 11c, 11d constituting the polarized-light selective reflection layer 11) depends directly on the number of helical turns, it depends indirectly on the thickness of the polarized-light selective reflection layer 11 (or each partial selective reflection layer 11a, 11b, 11c, 11d constituting the polarized-light selective reflection layer 11) if the helical pitch is fixed. Specifically, since it is said that approximately 4 to 8 helical turns are needed to obtain a reflectance of 100%, each partial selective reflection layer 11a, 11b, 11c that reflects light in the red (R), green (G) or blue (B) color wave range is required to have a thickness of approximately 1 to 10 μm although this thickness varies depending on the type of the components of the liquid crystalline composition used for forming this layer and on the selective reflection wave range of this layer. On the other hand, the polarized-light selective reflection layer 11 (or each partial selective reflection layer 11a, 11b, 11c, 11d constituting the polarized-light selective reflection layer 11) should not be made thick limitlessly because if the layer is excessively thick, it becomes difficult to control the orientation of the layer, the layer cannot be made uniform, and the material itself for the layer absorbs light to a greater extent. For this reason, a thickness in the above-described range is proper for the polarized-light selective reflection layer 11 (or each partial selective reflection layer).

Next, explanation for the substrate 12 will be given below.

The substrate 12 is for supporting the polarized-light selective reflection layer 11, and a material selected from plastic films, metals, paper, cloth, glass, and the like can be used for forming the substrate 12.

It is herein preferable that the substrate 12 comprises a light-absorbing layer adapted to absorb light in the visible region.

Figure 8:
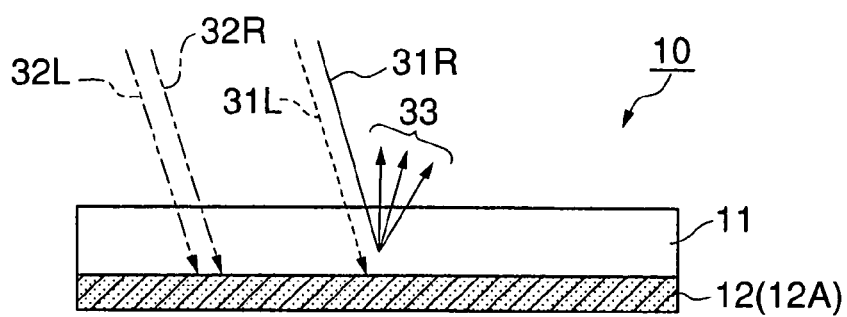
FIG. 8 is a diagrammatic sectional view showing a further modification of the projection screen shown in FIG. 1.

Specifically, for example, the substrate 12 (12A) may be made of a plastic film in which a black pigment is incorporated (e.g., a black PET film in which carbon is incorporated), as shown in FIG. 8. In this case, the substrate 12 (12A) itself serves as a light-absorbing layer (light-absorptive substrate). Such a substrate 12 absorbs those unpolarized light entering the projection screen 10 from the observation side that are inherently not reflected from the projection screen 10 as reflected light 33 (left-handed circularly polarized light 31L in the selective reflection wave range, and right-handed circularly polarized light 32R and left-handed circularly polarized light 32L not in the selective reflection wave range) and the light that enters the projection screen 10 from the backside. It is, therefore, possible to effectively prevent reflection of environmental light such as sunlight and light from lighting fixtures and production of stray light from imaging light.

Figure 9:
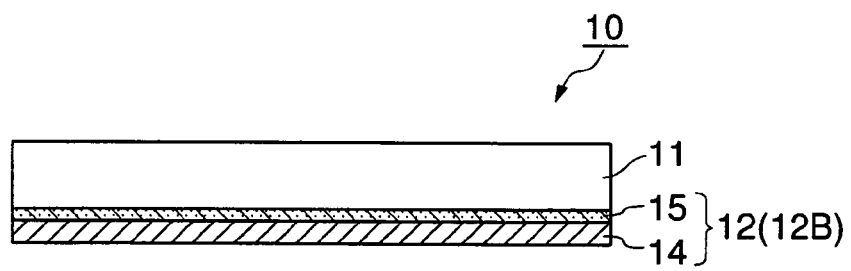
FIG. 9 is a diagrammatic sectional view showing a still further modification of the projection screen shown in FIG. 1.
Figure 10:
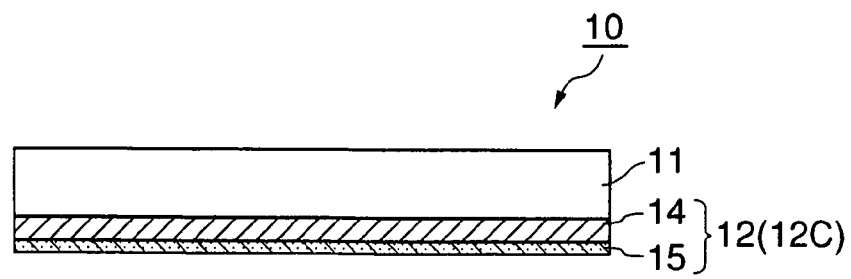
FIG. 10 is a diagrammatic sectional view showing a yet further modification of the projection screen shown in FIG. 1.

The embodiment of the substrate 12 (12A) is not limited to the one shown in FIG. 8. The substrate 12 (12B, 12C) may also be obtained in the following manner: a light-absorbing layer 15 comprising a black pigment or the like is formed on one surface of a transparent support film 14 such as a plastic film, as shown in FIGS. 9 and 10.

To make the substrate 12 windable, the thickness of the substrate 12 is made preferably 15 to 300 μm, more preferably 25 to 100 μm. On the other hand, when the substrate 12 is not required to have flexibility as in the case where a panel-type projection screen is produced, the thickness of the substrate 12 can be made great limitlessly.

Examples of plastic films that can be used as materials for the substrate 12 or the support film 14 include films of such thermoplastic polymers as polycarbonate polymers, polyester polymers including polyethylene terephthalate, polyimide polymers, polysulfone polymers, polyether sulfone polymers, polystyrene polymers, polyolefin polymers including polyethylene and polypropylene, polyvinyl alcohol polymers, cellulose acetate polymers, polyvinyl chloride polymers, polyacrylate polymers, and polymethyl methacrylate polymers. Materials for the substrate 12 are not limited to the above-described polymers, and it is also possible to use such materials as metals, paper, cloth and glass.

Layering of the polarized-light selective reflection layer 11 over the substrate 12 is usually conducted by applying a cholesteric liquid crystalline composition and then subjecting the applied layer to aligning treatment and curing treatment, as will be described later.

In the above process, since it is necessary to control the cholesteric liquid crystalline structure of the polarized-light selective reflection layer 11 to the state of non-planar orientation, it is preferable to use, as the substrate 12, a material whose surface to which the liquid crystalline composition will be applied has no aligning power.

However, even when a material whose surface to which the liquid crystalline composition will be applied has aligning power like a stretched film is used as the substrate 12, the cholesteric liquid crystalline structure of the polarized-light selective reflection layer 11 can be made in the state of non-planar orientation if this surface of the material is subjected in advance to surface treatment, the components of the liquid crystalline composition are properly selected, or the process conditions under which the liquid crystalline composition is oriented are controlled.

Figure 11:
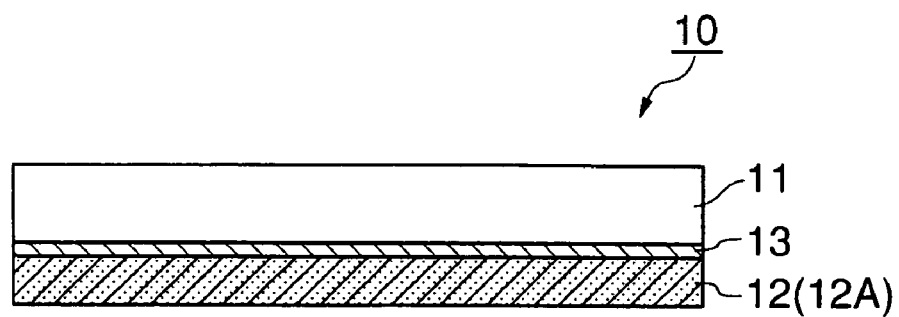
FIG. 11 is a diagrammatic sectional view showing still another modification of the projection screen shown in FIG. 1.
Figure 12:
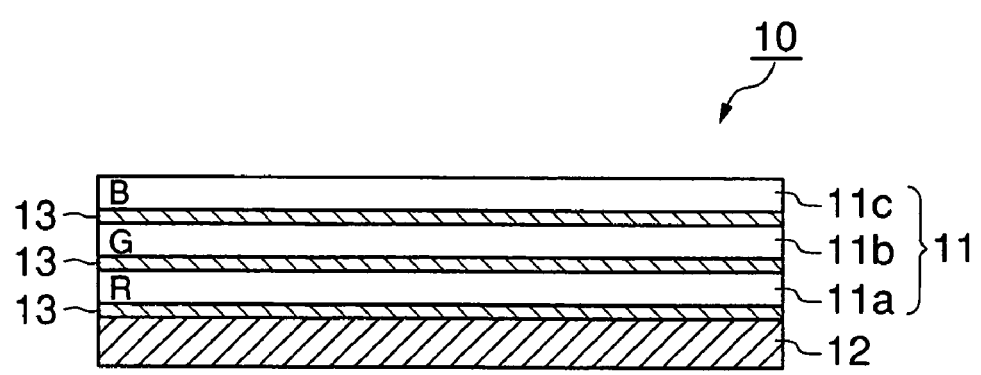
FIG. 12 is a diagrammatic sectional view showing a further modification of the projection screen shown in FIG. 1.

Further, even if a material whose surface to which the liquid crystalline composition will be applied has aligning power is used as the substrate 12, it is possible to control the orientation of the cholesteric liquid crystalline structure of the polarized-light selective reflection layer 11 by providing an intermediate layer 13, such as an adherent layer, between the polarized-light selective reflection layer 11 and the substrate 12 (12A), as shown in FIG. 11, thereby directing, to a plurality of directions, the directors of liquid crystalline molecules constituting the cholesteric liquid crystalline structure of the polarized-light selective reflection layer 11, existing in the vicinity of the intermediate layer 13. By providing the intermediate layer 13 such as an adherent layer, it is also possible to improve the adhesion between the polarized-light selective reflection layer 11 and the substrate 12. For such an intermediate layer 13, any material can be used as long as it is highly adherent to both the material for the polarized-light selective reflection layer 11 and the material for the substrate 12, and commercially available materials may be used. Specific examples of materials that can be used for the intermediate layer 13 include an adherent-layer-containing PET film A4100 manufactured by Toyobo Co., Ltd., Japan and adherent materials AC-X, AC-L and AC-W manufactured by Panack Co., Ltd., Japan. A black pigment or the like may be incorporated in the intermediate layer 13, thereby using the intermediate layer 13 as a light-absorbing layer adapted to absorb light in the visible region, as in the case of the substrate 12 (12A) shown in FIG. 8. Further, as shown in FIG. 12, the intermediate layer 13 such as an adherent layer may also be provided, if necessary, between each neighboring two of the partial selective reflection layers 11a, 11b and 11c that are layered over the substrate 12.

In the case where the surface of the substrate 12 has no aligning power and the adhesion between the polarized-light selective reflection layer 11 and the substrate 12 is satisfactorily high, it is not necessarily required to provide the intermediate layer 13. To improve the adhesion between the polarized-light selective reflection layer 11 and the substrate 12, a process-related method such as corona discharge treatment or UV cleaning may also be used.

A process of producing the above-described projection screen 10 will be described hereinafter.

The substrate 12 over which the polarized-light selective reflection layer 11 will be layered is firstly prepared. If necessary, the intermediate layer 13 such as an adherent layer is layered over the surface of the substrate 12 on the side on which the polarized-light selective reflection layer 11 will be formed. The surface of the substrate 12 (the surface of the intermediate layer 13, if the intermediate layer 13 is present) to which a liquid crystalline composition will be applied is made to have no aligning power.

Thereafter, a cholesteric liquid crystalline composition is applied to the above-prepared substrate 12 and is then subjected to aligning treatment and curing treatment, whereby a first layer serving as the partial selective reflection layer 11a is layered over (fixed to) the substrate 12.

The steps (the steps of application, alignment and curing) for layering (fixing) the first layer, the partial selective reflection layer 11a, will be described below in detail.

(Step of Application)

In the step of application, a cholesteric liquid crystalline composition is applied to the substrate 12 to form thereon a cholesteric liquid crystal layer. Any of the known methods can be employed to apply the liquid crystalline composition to the substrate 12. Specifically, a roll, gravure, bar, slide, die, slit, or dip coating method can be used for this purpose. In the case where a plastic film is used as the substrate 12, a film coating method using a so-called roll-to-roll system may be used.

For the liquid crystalline composition that is applied to the substrate 12, a cholesteric, chiral nematic liquid crystal or a cholesteric liquid crystal may be used. Although any liquid crystalline material can be used as long as it can develop a cholesteric liquid crystalline structure, particularly preferable one for obtaining, after curing, an optically stable, partial selective reflection layer 11a is a polymerizable liquid crystalline material having polymerizable functional groups at both ends of its molecule.

Explanation will be given below with reference to the case where a chiral nematic liquid crystal is used for the liquid crystalline composition. The chiral nematic liquid crystal is a mixture of a polymerizable, nematic liquid crystalline material and a chiral agent. The chiral agent herein refers to an agent for controlling the helical pitch in the polymerizable, nematic liquid crystalline material to make the resulting liquid crystalline composition cholesteric as a whole. By varying the chiral power by changing the type of the chiral agent to be added to a liquid crystalline composition, or by varying the content of the chiral agent in the liquid crystalline composition, it is possible to control the center wavelength of the selective reflection wave range that is determined by the molecular structure of the polymerizable liquid crystalline material. To the liquid crystalline composition, a polymerization initiator and other proper additives are added.

Examples of polymerizable, nematic liquid crystalline materials include compounds represented by the following general formula (1) and formulae (2-i) to (2-xi). These compounds may be used either singly or in combination.

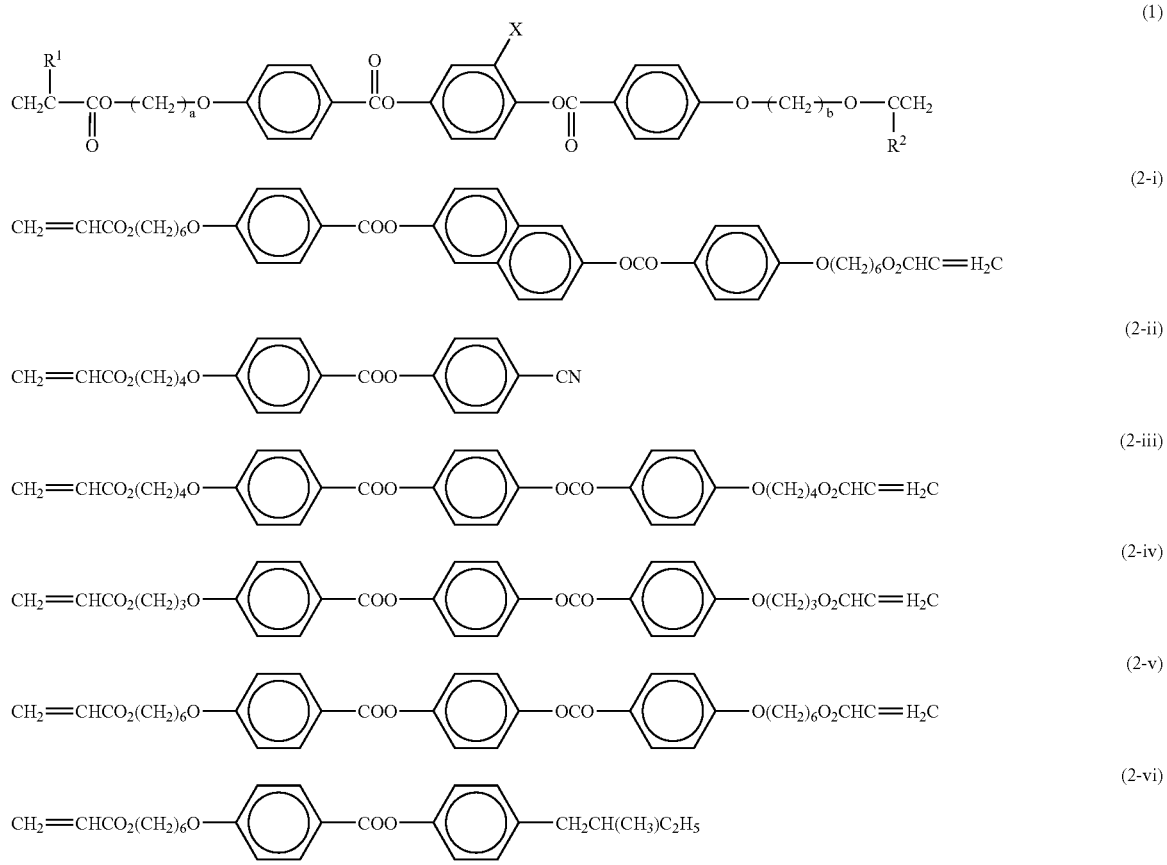

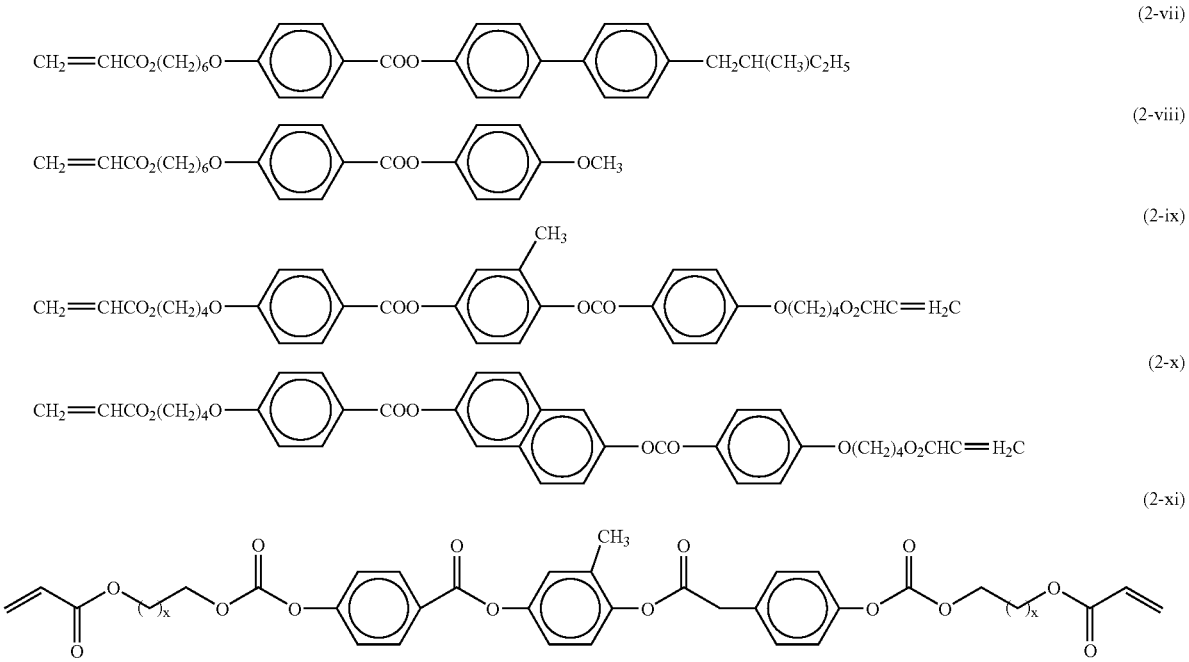

where X is an integer of 2–5

In the above general formula (1), $R^1$ and $R^2$ independently represent hydrogen or methyl group. It is, however, preferable that both $R^1$ and $R^2$ represent hydrogen because a liquid crystalline composition containing such a compound shows a liquid crystal phase at temperatures in a wider range. X is hydrogen, chlorine, bromine, iodine, an alkyl group having 1 to 4 carbon atoms, methoxy group, cyano group or nitro group, preferably chlorine or methyl group. Further, in the above general formula (1), a and b that denote the chain lengths of the alkylene groups that serve as spacers between the (meth)acryloyloxy groups on both ends of the molecule and the aromatic rings are independently an integer of 2 to 12, preferably an integer of 4 to 10, more preferably an integer of 6 to 9. Those compounds represented by the general formula (1) in which a=b=0 are unstable, easily undergo hydrolysis, and have high crystallinity. On the other hand, those compounds represented by the general formula (1) in which a and b are independently an integer of 13 or more have low isotropic transition temperatures (TI's). These compounds are unfavorable because they show liquid crystal phases at temperatures in narrow ranges.

Although a polymerizable liquid crystal monomer is, in the above description, used as the polymerizable, nematic liquid crystalline material, it is also possible to use a polymerizable liquid crystal oligomer or polymer, a liquid crystal polymer, or the like, properly selected from conventionally proposed ones.

On the other hand, the chiral agent is a low molecular weight compound containing an optically active site, usually having a molecular weight of not more than 1,500. The chiral agent is used in order to convert the positive monoaxially-nematic structure of a polymerizable, nematic liquid crystalline material into a helical structure. Any type of low molecular weight compounds capable of attaining the above purpose may be used as the chiral agent as long as it is compatible with the polymerizable, nematic liquid crystalline material in the state of solution or melt and can, as desired, make the liquid crystalline structure helical without impairing the liquid crystallinity of the material.

The chiral agent that is used for making the structure of a liquid crystal helical is required to have any type of chirality at least in its molecule. Examples of chiral agents useful herein include those compounds having 1, or 2 or more asymmetric carbon atoms, those compounds having asymmetric centers on hetero atoms, such as chiral amines or sulfoxides, and those axially chiral compounds having optically active sites, such as cumulene and binaphthol. More specific examples of chiral agents include commercially available chiral nematic liquid crystals such as a chiral dopant liquid crystal "S-811" manufactured by Merck KGaA, Germany.

However, depending on the nature of the chiral agent selected, the following problems can occur: the nematic state of the polymerizable, nematic liquid crystalline material is destroyed, and the polymerizable, nematic liquid crystalline material loses its alignability; and, if the chiral agent is non-polymerizable, the liquid crystalline composition has decreased hardenability, and the cured film is poor in reliability. Moreover, the use of a large amount of a chiral agent having an optically active site boosts the cost of the liquid crystalline composition. Therefore, to form a polarized-light selective reflection layer having a cholesteric structure with a short helical pitch, it is preferable to select, as the optically-active-site-containing chiral agent to be incorporated in the liquid crystalline composition, a chiral agent whose helical structure-developing action is great. Specifically, it is preferable to use one of the compounds represented by the following general formulae (3), (4) and (5), which are low-molecular-weight compounds whose molecules are axially chiral.

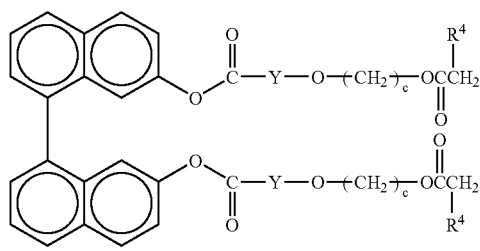
(3)
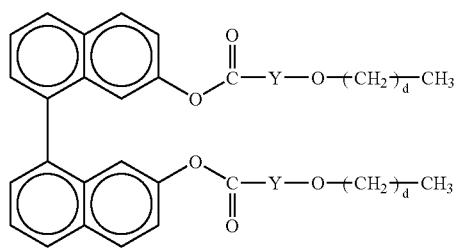
(4)
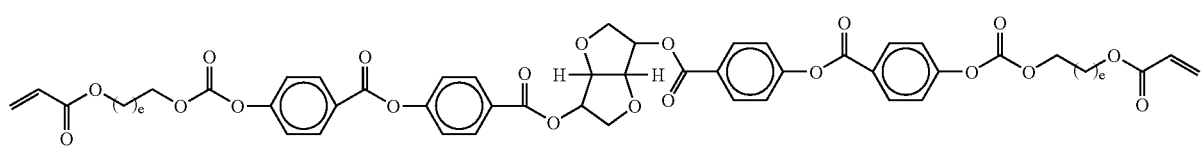
(5)
where e is an integer of 2–5
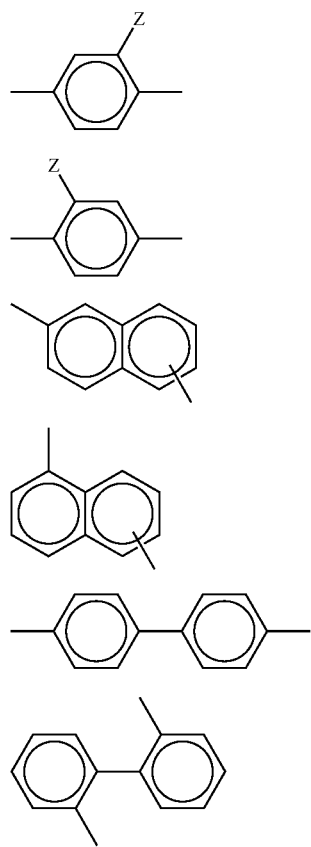
-continued
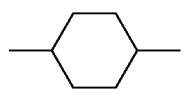  (vii)
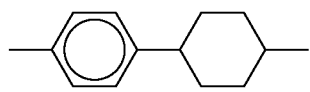  (viii)
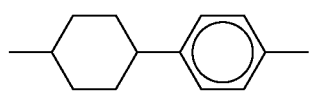  (ix)
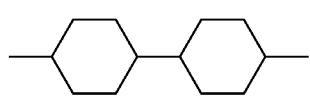  (x)
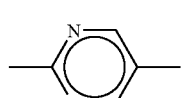  (xi)
(xii)
(xiii)
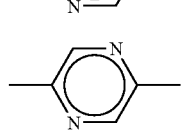  (xiv)

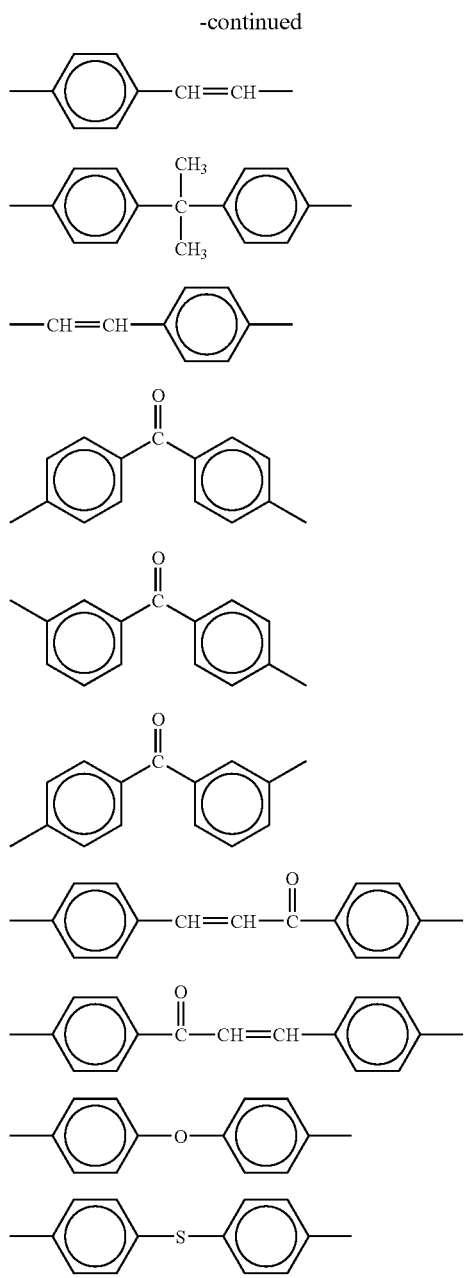

In the above general formulae (3) and (4), $R^4$ represents hydrogen or methyl group; Y is one of the above-enumerated groups (i) to (xxiv), preferably (i), (ii), (iii), (v) or (vii); and c and d that denote the chain lengths of the alkylene groups are independently an integer of 2 to 12, preferably an integer of 4 to 10, more preferably an integer of 6 to 9. Those compounds represented by the above general formula (3) or (4) in which c or d is 0 or 1 are poor in stability, easily undergo hydrolysis, and have high crystallinity. On the other hand, those compounds represented by the general formula (3) or (4) in which c or d is 13 or more have low melting points (Tm's). These compounds are less compatible with the polymerizable, nematic liquid crystalline material, so that a liquid crystalline composition containing such a compound can cause phase separation depending on the concentration of the compound.

The chiral agent is not necessarily polymerizable. However, if the chiral agent is polymerizable, it is polymerized with the polymerizable, nematic liquid crystalline material to give a stably fixed cholesteric structure. Therefore, from the viewpoints of thermal stability and so forth, it is highly desirable that the chiral agent be polymerizable. In particular, the use of a chiral agent having polymerizable functional groups at both ends of its molecule is preferred for production of a partial selective reflection layer 11a excellent in heat resistance.

The content of the chiral agent in the liquid crystalline composition is optimally decided with consideration for the helical structure-developing ability of the chiral agent, the cholesteric liquid crystalline structure of the resulting partial selective reflection layer 11a, and so forth. Specifically, although the amount of the chiral agent to be added greatly varies depending upon the components of the liquid crystalline composition, it is from 0.01 to 60 parts by weight, preferably from 0.1 to 40 parts by weight, more preferably from 0.5 to 30 parts by weight, most preferably from 1 to 20 parts by weight, for 100 parts by weight of the liquid crystalline composition. In the case where the amount of the chiral agent added is smaller than this range, there is a possibility that the liquid crystalline composition cannot fully become cholesteric. On the other hand, when the amount of the chiral agent added exceeds the above-described range, the alignment of liquid crystalline molecules is impeded, which can adversely affect the curing of the liquid crystalline composition that is conducted by the application of activating radiation or the like.

Although the liquid crystalline composition can be applied as it is to the substrate 12, it may be dissolved in a suitable solvent such as an organic solvent to give an ink in order to make the viscosity of the liquid crystalline composition fit for an applicator or to attain excellent alignment of liquid crystalline molecules.

Although any solvent can be used for the above purpose as long as it can dissolve the above-described polymerizable liquid crystalline material, it is preferable that the solvent does not attack the substrate 12. Specific examples of solvents useful herein include acetone, 3-methoxy-butyl acetate, diglyme, cyclohexanone, tetrahydrofuran, toluene, xylene, chlorobenzene, methylene chloride, and methyl ethyl ketone. The polymerizable liquid crystalline material may be diluted to any degree. However, considering that a liquid crystal itself is a material having low solubility and high viscosity, it is preferable to dilute the polymerizable, liquid crystalline material to about 5 to 50%, more preferably about 10 to 30%.

(Step of Alignment)

After applying the liquid crystalline composition to the substrate 12 to form thereon a cholesteric liquid crystal layer in the above-described step of application, the cholesteric liquid crystal layer is, in the step of alignment, held at a predetermined temperature at which the cholesteric liquid crystal layer develops a cholesteric liquid crystalline structure, thereby aligning liquid crystalline molecules in the cholesteric liquid crystal layer.

The cholesteric liquid crystalline structure of the partial selective reflection layer 11a that should be finally obtained is one not in such a state of planar orientation as is shown in FIG. 2B but in such a state of orientation as is shown in FIG. 2A, in which a plurality of helical structure parts 30 that are different in the direction of helical axis L are present. Even so, it is necessary to conduct aligning treatment. Namely, although it is not necessary to conduct aligning treatment for aligning, in one direction on the substrate 12, the directors of liquid crystalline molecules in the cholesteric liquid crystalline structure, it is necessary to conduct such aligning treatment as to produce a plurality of the helical structure parts 30 in the cholesteric liquid crystalline structure.

When the cholesteric liquid crystal layer formed on the substrate 12 is held at a predetermined temperature at which the cholesteric liquid crystal layer develops a cholesteric liquid crystalline structure, it shows a liquid crystal phase. At this time, owing to the self-accumulating action of liquid crystalline molecules themselves, continuous rotation of the directors of the liquid crystalline molecules occurs in the direction of the thickness of the layer, and a helical structure is produced. It is possible to fix this cholesteric liquid crystalline structure, which has been developed as a liquid crystal phase, by curing the cholesteric liquid crystal layer using such a technique as will be described later.

In the case where the liquid crystalline composition applied to the substrate 12 contains a solvent, the step of alignment is usually conducted along with drying treatment for removing the solvent. The drying temperature suitable for removing the solvent is from 40 to 120° C., preferably from 60 to 100° C. Any drying time (heating time) will do as long as a cholesteric liquid crystalline structure is developed and substantially all of the solvent is removed. For example, the drying time (heating time) is preferably from 15 to 600 seconds, more preferably from 30 to 180 seconds. After the drying treatment, if it is realized that the liquid crystal layer has not fully been orientated, this layer may be further heated accordingly. In the case where this drying treatment is conducted by means of vacuum drying, it is preferable to separately conduct heat treatment in order to align liquid crystalline molecules.

(Step of Curing)

After aligning liquid crystalline molecules in the cholesteric liquid crystal layer in the above-described step of alignment, the cholesteric liquid crystal layer is cured in the step of curing, thereby fixing the cholesteric liquid crystalline structure that has been developed as a liquid crystal phase.

To effect the step of curing, it is possible to use: (1) a method in which the solvent contained in the liquid crystalline composition is evaporated; (2) a method in which liquid crystalline molecules in the liquid crystalline composition are thermally polymerized; (3) a method in which liquid crystalline molecules in the liquid crystalline composition are polymerized by the application of radiation; or (4) any combination of these methods.

Of the above methods, the method (1) is suitable for the case where a liquid crystal polymer is used as the polymerizable, nematic liquid crystalline material that is incorporated in the liquid crystalline composition, a material for the cholesteric liquid crystal layer. In this method, the liquid crystal polymer dissolved in a solvent such as an organic solvent is applied to the substrate 12. In this case, a solidified, cholesteric liquid crystal layer can be obtained by simply removing the solvent by drying. The type of the solvent, the drying conditions, and so on may be the same as those ones in the aforementioned steps of application and alignment.

The above-described method (2) is for curing the cholesteric liquid crystal layer by thermally polymerizing liquid crystalline molecules in the liquid crystalline composition by heating. In this method, the state of bonding of the liquid crystalline molecules varies according to heating (baking) temperature. Therefore, if the cholesteric liquid crystal layer is heated non-uniformly, the cured layer cannot be uniform in physical properties such as film hardness and in optical properties. In order to limit variations in film hardness to ±10%, it is preferable to control the heating temperature so that it varies only within ±5%, more preferably ±2%.

Any method may be employed to heat the cholesteric liquid crystal layer formed on the substrate 12 as long as it can provide uniformity in heating temperature. The liquid crystal layer may be placed directly on a hot plate and held as it is, or placed indirectly on a hot plate with a thin air layer interposed between the liquid crystal layer and the hot plate and held in parallel with the hot plate. Besides, a method using a heater capable of entirely heating a particular space, such as an oven, may be employed, where the liquid crystal layer is placed in or passed through such a heater. If a film coater or the like is used, it is preferable to make the drying zone long enough to make the heating time sufficiently long.

The heating temperature required is usually as high as 100° C. or more. However, in consideration of the heat resistance of the substrate 12, it is preferable to limit this temperature to below approximately 150° C. If a film or the like specialized with respect to heat resistance is used as the substrate 12, the heating temperature can be made as high as above 150° C.

The above-described method (3) is for curing the cholesteric liquid crystal layer by photo-polymerizing liquid crystalline molecules in the liquid crystalline composition by the application of radiation. In this method, electron beams, ultraviolet rays, or the like fitting for the conditions can be used as the radiation. In general, ultraviolet light is preferred because of the simplicity of ultraviolet light irradiation systems, and so forth. The wavelength of ultraviolet light useful herein is from 250 to 400 nm. If ultraviolet light is used, it is preferable to incorporate a photopolymerization initiator in the liquid crystalline composition in advance.

Examples of photopolymerization initiators that can be incorporated in the liquid crystalline composition include benzyl (bibenzoyl), benzoin isobutyl ether, benzoin isopropyl ether, benzophenone, benzoyl benzoic acid, benzoyl methylbenzoate, 4-benzoyl-4'-methyldiphenylsulfide, benzylmethyl ketal, dimethylamino-methyl benzoate, 2-n-butoxyethyl-4-dimethylaminobenzoate, isoamyl p-dimethylaminobenzoate, 3,3'-dimethyl-4-methoxybenzophenone, methyl-benzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclo-hexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-choloro-4-propoxythioxanthone. In addition to photopolymerization initiators, sensitizers may be added to the liquid crystalline composition unless they hinder the attainment of the object of the present invention.

The amount of the photopolymerization initiator to be added to the liquid crystalline composition is from 0.01 to 20% by weight, preferably from 0.1 to 10% by weight, more preferably from 0.5 to 5% by weight, of the liquid crystalline composition.

By successively layering other cholesteric liquid crystal layers (partial selective reflection layers) over the partial selective reflection layer 11a by repeatedly effecting a series of the above-described steps (steps of application, alignment, and curing), it is possible to obtain a projection screen 10 comprising a polarized-light selective reflection layer 11 composed of a plurality of partial selective reflection layers 11a, 11b, and 11c. Namely, by successively layering a plurality of cholesteric liquid crystal layers over the substrate with the center wavelengths of the selective reflection wave ranges of the cholesteric, liquid crystalline compositions to be applied controlled, it is possible to obtain such a projection screen 10 as is shown in FIG. 1, comprising, as the polarized-light selective reflection layer 11, a partial selective reflection layer 11c for selectively reflecting light in the blue (B) color wave range, a partial selective reflection layer 11b for selectively reflecting light in the green (G) color wave range, and a partial selective reflection layer 11a for selectively reflecting light in the red (R) color wage range that are layered in this order, the partial selective reflection layer 11c being on the observation side.

In this case, as long as the underlying cholesteric liquid crystal layer has been formed and solidified, a liquid crystalline composition for forming the second or later cholesteric liquid crystal layer can be applied by using the same technique as in the formation of the first cholesteric liquid crystal layer. Continuity is, in this case, produced between the cholesteric liquid crystalline structure (the state of orientation) of the upper cholesteric liquid crystal layer and that of the lower cholesteric liquid crystal layer. It is, therefore, unnecessary to provide an alignment-controlling layer or the like between these two cholesteric liquid crystal layers. However, an intermediate layer such as an adherent layer may be provided between these two cholesteric liquid crystal layers, as needed. In the formation of the second and later cholesteric liquid crystal layers, the conditions under which the steps of application, alignment and curing are conducted and the materials that are used for forming the cholesteric liquid crystal layers are as mentioned above, so that explanation for them is herein omitted.

Figure 5:
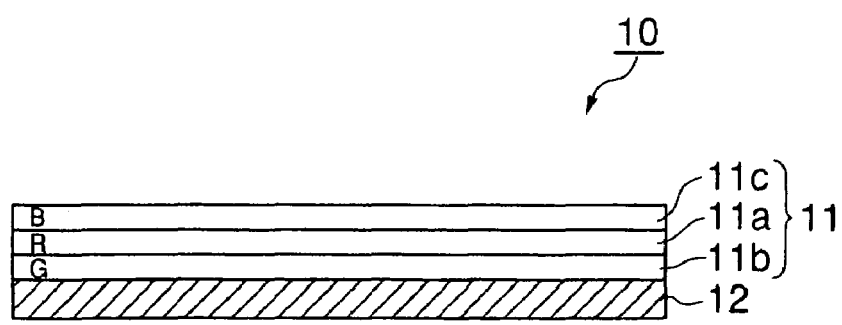
FIG. 5 is a diagrammatic sectional view showing a modification of the projection screen shown in FIG. 1.

By the use of the above-described production process, it is also possible to produce a projection screen 10 in which a partial selective reflection layer 11c for selectively reflecting light in the blue (B) color wave range, a partial selective reflection layer 11a for selectively reflecting light in the red (R) color wave range, and a partial selective reflection layer 11b for selectively reflecting light in the green (G) color wave range are, as shown in FIG. 5, layered in this order, the partial selective reflection layer 11c being on the observation side, or a projection screen 10 in which a partial selective reflection layer 11c for selectively reflecting light in the blue (B) color wave range and a partial selective reflection layer 11d for selectively reflecting light in the green (G) and red (R) color wave ranges are, as shown in FIG. 7, layered in this order, the partial selective reflection layer 11c being on the observation side Thus, the projection screen 10 produced in the above-described manner comprises the polarized-light selective reflection layer 11 composed of a plurality of the partial selective reflection layers 11a, 11b and 11c, each partial selective reflection layer having a cholesteric liquid crystalline structure that causes selective reflection of a specific polarized-light component, and, owing to structural non-uniformity in the cholesteric liquid crystalline structure that is brought about, for example, by the helical structure parts 30 of the cholesteric liquid crystalline structure that are different in the direction of helical axis L, it diffuses light that is selectively reflected.

Each partial selective reflection layer 11a, 11b, 11c in the polarized-light selective reflection layer 11 selectively reflects only a specific polarized-light component (e.g., right-handed circularly polarized light) owing to the polarized-light-separating property of the cholesteric liquid crystalline structure, so that the polarized-light selective reflection layer 11 can be made to reflect only approximately 50% of the unpolarized environmental light, such as sunlight and light from lighting fixtures, incident on this layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the polarized-light component which the polarized-light selective reflection layer 11 selectively reflects (e.g., right-handed circularly polarized light), the polarized-light selective reflection layer 11 can reflect nearly 100% of the imaging light projected, that is, the polarized-light selective reflection layer 11 can efficiently reflect the imaging light.

Furthermore, since each partial selective reflection layer 11a, 11b, 11c in the polarized-light selective reflection layer 11 has a structurally non-uniform, cholesteric liquid crystalline structure in which the helical structure parts 30 have helical axes extending in different directions, the polarized-light selective reflection layer 11 reflects imaging light not by specular reflection but by diffuse reflection, and the reflected light can thus be well recognized as an image. At this time, owing to structural non-uniformity in the cholesteric liquid crystalline structure, each partial selective reflection layer 11a, 11b, 11c in the polarized-light selective reflection layer 11 diffuses light that is selectively reflected, so that the polarized-light selective reflection layer 11 can reflect a specific polarized-light component (e.g., right-handed circularly polarized light 31R in the selective reflection wave range) while diffusing it, and, at the same time, transmits the other light components (e.g., left-handed circularly polarized light 31L in the selective reflection wave range, and right-handed circularly polarized light 32R and left-handed circularly polarized light 32L not in the selective reflection wave range) without diffusing them. For this reason, the environmental light and imaging light that pass through the polarized-light selective reflection layer 11 do not undergo the previously-mentioned "depolarization", and it is thus possible to improve image visibility while maintaining the polarized-light-separating property inherent in the polarized-light selective reflection layer 11.

Thus, the above-described projection screen 10 can provide increased image contrast by suppressing the influence of environmental light such as sunlight and light from lighting fixtures by making use of the polarized-light-separating property of the cholesteric liquid crystalline structure, and, because of structural non-uniformity in the cholesteric liquid crystalline structure, diffuse the imaging light that is reflected, without causing decrease in image visibility, so that it can sharply display an image even under bright environmental light. Moreover, the projection screen 10 can provide improved image visibility because it has such a layered structure as to increase the efficiency of reflection of blue (B) light.

Further, in the above-described projection screen 10, the polarized-light selective reflection layer 11 is made to selectively reflect light in a specific wave range that covers only a part of the visible region. It is, therefore, possible to further suppress the influence of environmental light such as sunlight and light from lighting fixtures to increase image contrast, thereby further improving image visibility.

The above embodiment has been described with reference to the case where each partial selective reflection layer 11a, 11b, 11c in the polarized-light selective reflection layer 11 constituting the projection screen 10 has a cholesteric liquid crystalline structure in the state of non-planar orientation which the helical axes L extend in different directions in the layer, as shown in FIG. 2A. However, the structure of each partial selective reflection layer is not limited to this, and a polarized-light selective reflection layer composed of partial selective reflection layers having any structure can be used as long as the partial selective reflection layers can selectively diffuse-reflect a specific polarized-light component (layers made of organic films that absorb light in a wave range extending on the shorter wavelength side (short-wave light)).

Specifically, for example, the polarized-light selective reflection layer 11 may comprise a polarized-light selective reflection layer body for selectively reflecting a specific polarized-light component (e.g., a polarized-light selective reflection layer composed of a plurality of partial selective reflection layers, each layer having such a cholesteric liquid crystalline structure in the state of planar orientation as is shown in FIG. 2B, causing specular reflection), and a diffusing element for diffusing the light reflected from the polarized-light selective reflection layer body. By so constituting the polarized-light selective reflection layer 11, it is possible to make the polarized-light-separating property and diffusing properties independent of each other, and is thus possible to easily control these two properties. The diffusing element may be any one of bulk diffusers, surface diffusers and hologram diffusers, or any combination of these diffusers. A bulk diffuser may be particles put in a transparent medium, for example. A surface diffuser may be a structured, micro-structured, or roughened surface, for example. The diffusion provided by the diffuser may be random, regular, or partly regular.

The polarized-light selective reflection layer 11 may also be a layer that diffuse-reflects, as the specific polarized-light component, linearly polarized light. Linearly polarized light includes light in two different states of polarization, the directions of vibration being at right angles to each other. Therefore, if the direction of linear polarization of light to be emitted from a projector is made identical with the direction of linear polarization of light which the polarized-light selective reflection layer 11 diffuse-reflects, the projection screen 10 can brightly display an image. A multi-layered reflective polarizer having diffusing properties, made from materials different in refractive index (e.g., DBEF manufactured by Sumitomo 3M Limited, Japan), can also be mentioned, for example, as the layer that diffuse-reflects linearly polarized light as the specific polarized-light component. Linearly polarized light is composed of so-called P-polarized light (a component parallel to the plane of incidence) and S-polarized light (a component vertical to the plane of incidence). Therefore, when the layer that diffuse-reflects linearly polarized light selectively diffuse-reflects only a specific polarized-light component (e.g., P- or S-polarized light), it can increase image contrast like the above-described polarized-light selective reflection layer 11. Further, this layer can efficiently reflect imaging light if the imaging light to be projected on the layer is made to mainly contain P- or S-polarized light.

Although the above embodiment has been described by referring to the case where the substrate 12 of the projection screen 10 is an absorptive substrate containing a light-absorbing layer adapted to absorb light in the visible region, the substrate 12 may also be a transparent substrate capable of transmitting at least part of light in the visible region. If a transparent substrate is used, although the advantage of enhancing image contrast is lost, the projection screen 10 is highly transparent when it displays no image, and the background can therefore be clearly seen through the projection screen. Such a projection screen can be used in decorative applications; for example, it is fit for use on show windows. Moreover, by switching the viewing angle according to the situation, it is possible to produce a more effective eye-catching effect. For this reason, this projection screen can overcome the drawback of conventional information tools using projectors that have been unattractive in bright environments, and can effectively be used in such applications as billboards, bulletin boards, and guideboards. Although the transparent substrate is preferably less hazy, any material selected from acrylic esters, glass, vinyl chloride resins, etc. may be used for the substrate 12 as long as it can transmit light. Further, the transparent substrate is not necessarily colorless, and a colored one may also be used. Specifically, for example, it is possible to use transparent plastic or glass plates in a color of brown, blue, orange, or the like that are usually used for partition walls, windows, and so forth.

Furthermore, in the above-described projection screen 10, an intermediate layer having adhesion properties (an adherent layer) may be provided between the polarized-light selective reflection layer 11 and the substrate 12, or between each neighboring two of the partial selective reflection layers that constitute the polarized-light selective reflection layer 11. The intermediate layer may have barrier properties in addition to (or in place of) the adhesion properties. The barrier properties herein provide the following function: when the polarized-light selective reflection layer is layered directly over the substrate, or when one partial selective reflection layer is layered directly over another partial selective reflection layer, the constituents of the lower layer are prevented from migrating to (permeating through) the upper layer, or the constituents of the upper layer are prevented from migrating to (permeating through) the lower layer. If substances migrate between the upper and lower layers, the optical properties (wavelength selectivity, polarization selectivity, diffusing properties, etc.) inherent in the polarized-light selective reflection layer (or each partial selective reflection layer) that serves as the upper or lower layer are impaired. Such migration of substances is prevented when the above-described intermediate layer having barrier properties (barrier layer) is used. Specifically, for example, in the case where a partial selective reflection layer is layered over another partial selective reflection layer by applying a cholesteric liquid crystalline composition, a nematic liquid crystal component contained in the liquid crystalline composition for forming the upper partial selective reflection layer may permeate through the lower partial selective reflection layer, depending on the components of the liquid crystalline composition, the process conditions, and so forth, thereby changing (increasing) the helical pitch in the lower partial selective reflection layer. Even in this case, if a barrier layer is provided between the lower and upper partial selective reflection layers, the migration (permeation) of the nematic liquid crystal component does not occur, and the optical properties (wavelength selectivity, polarization selectivity, diffusing properties, etc.) of the partial selective reflection layers are successfully maintained.

Examples of materials that can be used for forming such a barrier layer include modified acrylates, urethane acrylates, polyester acrylates, and epoxy resins. These compounds may be either monofunctional or polyfunctional and include monomers and oligomers. Specific examples of these compounds include ethoxylated trimethylolpropane triacrylate, propoxylated glyceryl triacrylate, pentaerythritol tetraacrylate, ditrimethylolpropane tetraacrylate, dipentaerythritol hydroxypentaacrylate, ethoxylated pentaerythritol tetraacrylate, pentaacrylic ester, pentaerythritol triacrylate, trimethylolpropane triacrylate, trimethylolpropane PO-modified triacrylate, isocyanuric acid EO-modified triacrylate, trimethylolpropane EO-modified triacrylate, dipentaerythritol penta- or hexa-acrylate, urethane adducts, aliphatic polyamine epoxy resins, polyaminoamide epoxy resins, aromatic diamine epoxy resins, alicyclic diamine epoxy resins, phenolic epoxy resins, amino epoxy resins, mercaptan epoxy resins, dicyandiamide epoxy resins, and Lewis acid complex epoxy resins.

Figure 13:
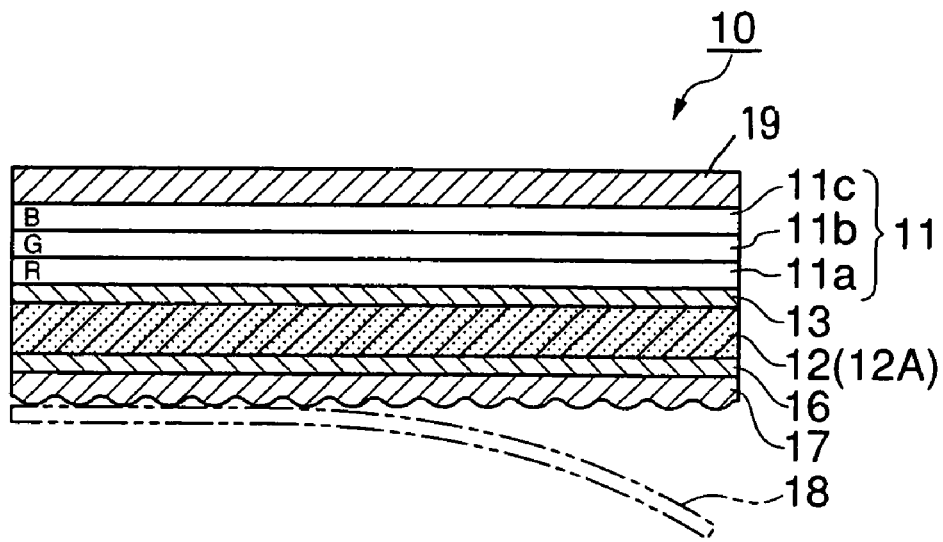
FIG. 13 is a diagrammatic sectional view showing a still further modification of the projection screen shown in FIG. 1.

In the above-described projection screen 10, a light-reflecting layer 16 for reflecting light incident on the substrate 12 may be provided on the surface of the substrate 12 opposite to the side on which the polarized-light selective reflection layer 11 is provided, as shown in FIG. 13. If a light-reflecting layer 16 is provided on the substrate 12 that contains a light-absorbing layer in such a fashion as is shown in FIGS. 8 to 10, environmental light such as sunlight and light from lighting fixtures, entering from the back side of the projection screen 10, is effectively reflected from the light-reflecting layer 16 before it reaches the substrate 12 (especially, the light-absorbing layer contained in the substrate 12), so that the generation of heat that is caused in the substrate 12 is effectively prevented. Preferable examples of materials for the light-reflecting layer 16 include white-colored scattering layers (paper, white-colored films, coatings, etc.), metallic plates, and aluminum powder films.

Further, as shown in FIG. 13, a pressure-sensitive adhesive layer 17 useful for affixing, to an external member, the substrate 12 on which the polarized-light selective reflection layer 11 is formed may be provided on the substrate 12 opposite to the side on which the polarized-light selective reflection layer 11 is provided (on the backside of the light-reflecting layer 16 in FIG. 13). If a pressure-sensitive adhesive layer 17 is so provided, the projection screen 10 can be affixed to an external member such as a white board or wall, if necessary. The pressure-sensitive adhesive layer 17 is preferably a layer that can separably adhere, to an external member, the substrate 12 on which the polarized-light selective reflection layer 11 is formed. It is, therefore, preferable to use, as the pressure-sensitive adhesive layer 17, a pressure-sensitive adhesive film with slight tackiness such as a releasable, pressure-sensitive adhesive film (manufactured by Panack Co., Ltd., Japan). Moreover, it is preferable to cover the surface of the pressure-sensitive adhesive layer 17 with a releasing film 18 in order to protect the pressure-sensitive adhesive layer 17 before use.

Furthermore, as shown in FIG. 13, a functional layer 19 may be provided on the observation-side surface of the polarized-light selective reflection layer 11. A variety of layers including hard coat (HC) layers, anti-glaring (AG) layers, anti-reflection (AR) layers, ultraviolet-light-absorbing (UV-absorbing) layers, and antistatic (AS) layers can be used as the functional layer 19.

The hard coat (HC) layer is for protecting the surface of the projection screen 10 and preventing it from being scratched or staining. The anti-glaring (AG) layer is for preventing the projection screen 10 from glaring. The anti-reflection (AR) layer is for preventing the surface of the projection screen 10 from reflecting light. The ultraviolet-light-absorbing (UV-absorbing) layer is for absorbing the ultraviolet component of light incident on the projection screen 10, the UV component being a cause of yellowing of the liquid crystalline composition. The antistatic (AS) layer is for removing static electricity that is generated in the projection screen 10. In the case where the antistatic layer is used as the functional layer 19, this layer is not necessarily provided on the observation-side surface of the projection screen 10, and may be provided on the back surface of the substrate 12. Moreover, carbon particles or the like may be incorporated in the substrate 12, thereby imparting, to the substrate 12 itself, the property of removing static electricity.

The functional layer 19 that is used as an anti-glaring layer acts to prevent the surface of the projection screen 10 from mirroring viewers and their surroundings, and is significant for clear image recognition. A transparent layer with a roughened surface is conveniently used as the anti-glaring layer, and by the use of such a layer, it is possible to effectively prevent mirroring of objects that is caused by interfacial reflection on the surface of the projection screen 10. Such a transparent layer can be obtained by roughening the surface of a transparent resin, glass, or the like by such a method as sandblasting, transfer of the shape of a molding surface at the time of shaping the surface with a mold, or chemical treatment. The surface of a transparent layer may be roughened either irregularly or regularly. To maintain the polarized-light-separating property of the polarized-light selective reflection layer 11, it is preferable that the anti-glaring layer be isotropic with respect to refractive index. Examples of materials useful for the anti-glaring layer include glass, resins such as acrylic resins and polyester resins, and TAC (triacetyl cellulose) films with matte surfaces.

Figure 14:
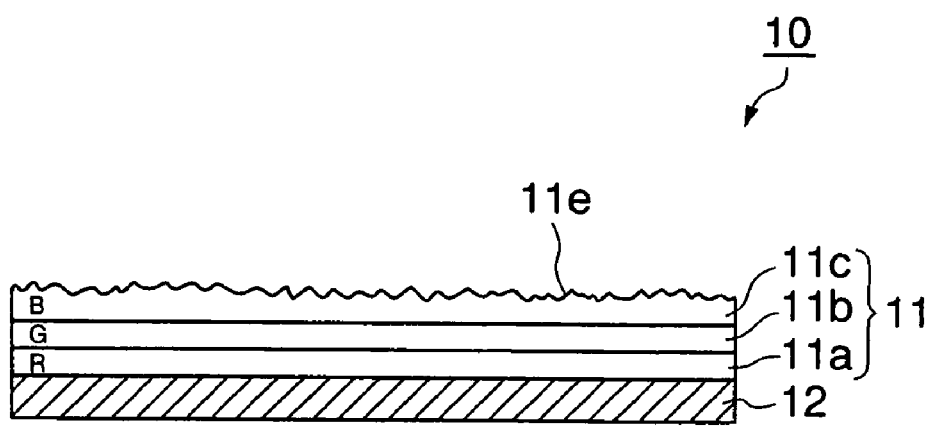
FIG. 14 is a diagrammatic sectional view showing a yet further modification of the projection screen shown in FIG. 1.

To impart anti-glaring properties to the projection screen 10, not only the functional layer 19 serving as an anti-glaring layer is formed separately from the polarized-light selective reflection layer 11, as shown in FIG. 13, but also the observation-side surface of the polarized-light selective reflection layer 11 (the surface of the partial selective reflection layer 11c situated on the observation side) may be, as shown in FIG. 14, provided with irregularities (see reference numeral 11e) by which anti-glaring properties are imparted to the polarized-light selective reflection layer 11 itself.

Projection System

Figure 15:
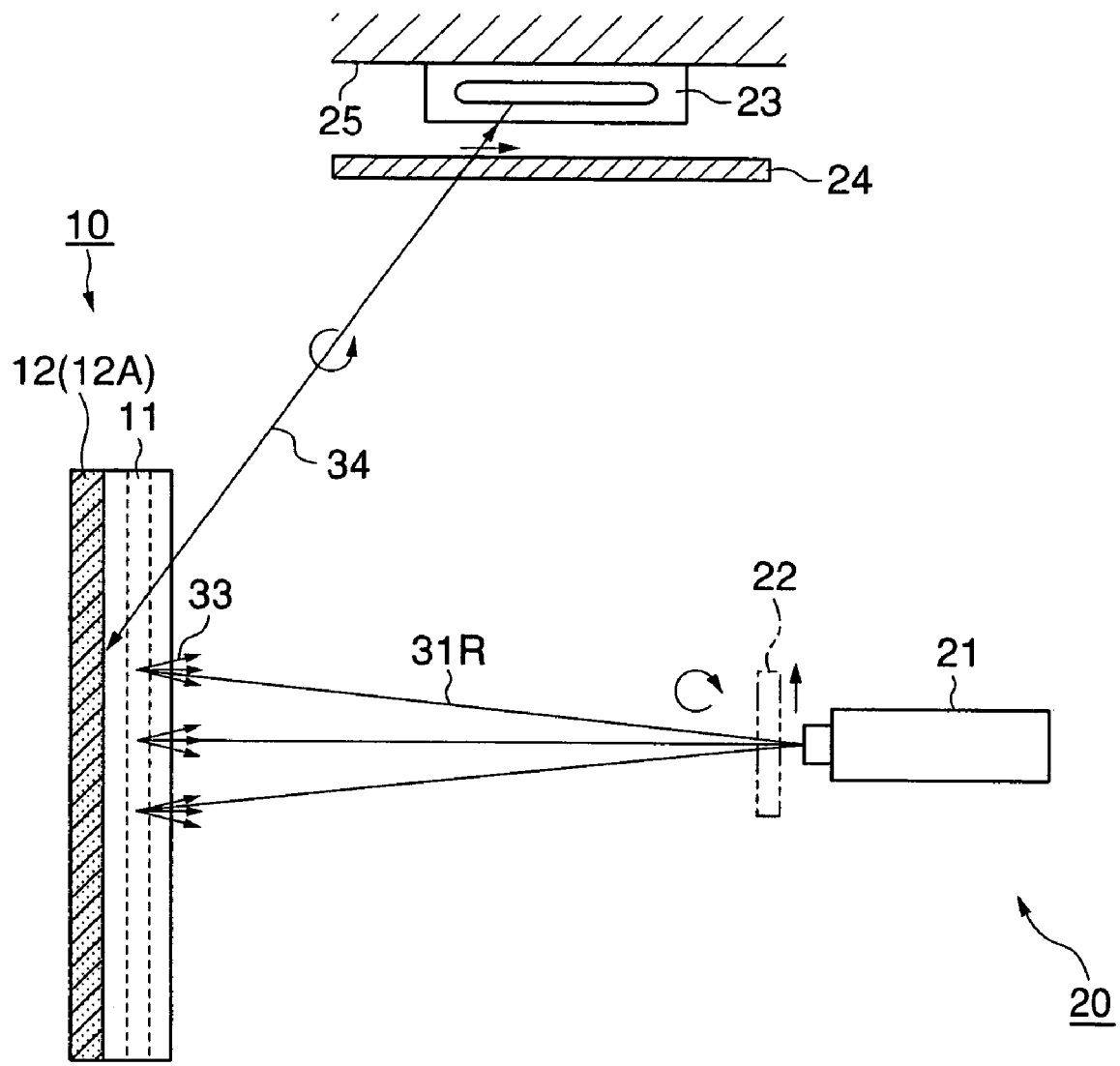
FIG. 15 is a diagrammatic view showing a projection system comprising the projection screen shown in FIG. 1.

The aforementioned projection screen 10 can be incorporated into a projection system 20 comprising a projector 21, as shown in FIG. 15.

As shown in FIG. 15, the projection system 20 comprises the projection screen 10 and the projector 21 for projecting imaging light on the projection screen 10.

The projector 21 may be of any type, and a CRT projector, a liquid crystal projector, a DLP (digital light processing) projector, or the like can be used. It is, however, preferable that the imaging light to be projected on the projection screen 10 from the projector 21 chiefly contains a polarized-light component (e.g., right-handed circularly polarized light) that is identical with the polarized-light component which the projection screen 10 selectively reflects.

Because of its operating principle, a liquid crystal projector useful as the projector 21 usually emits light that is polarized substantially linearly. In this case, by letting the imaging light emerge from the projector 21 through a retardation layer 22 or the like that serves as a polarized-light-converting element, it is possible to convert the linearly polarized light into circularly polarized light without causing the loss of the amount of light.

A quarter wave plate is preferably used as the retardation layer 22. Specifically, an ideal retardation layer is one capable of producing a phase difference of 137.5 nm for light of 550 nm whose visibility is the highest. Further, a wide-band quarter wave plate is more preferable because it is applicable to light in all of the red (R), green (G) and blue (B) color wave ranges. It is also possible to use a single retardation layer produced by controlling the birefringence of a material for this layer, or a combination of a quarter wave plate and a half wave plate.

The retardation layer 22 may be externally attached to the exit aperture of the projector 21, as shown in FIG. 15, or internally placed in the projector 21.

When a CRT or DLP projector is used as the projector 21, since the projector 21 emits unpolarized light, it is necessary to use a circular polarizer composed of a linear polarizer and a retardation layer in order to obtain circularly polarized light. If such a circular polarizer is used, although the amount of light emitted from the projector 21 itself is decreased to half, it is possible to effectively prevent the production of stray light or the like from a polarized-light component (e.g., left-handed circularly polarized light) that is different from the polarized-light component which the polarized-light selective reflection layer 11 in the projection screen 10 selectively reflects, thereby enhancing image contrast. In the case where linearly polarized light is produced by an optical system built in a projector, only a retardation layer may be used without using a linear polarizer.

A projector 21 usually attains color display by light in the wave ranges for red (R), green (G) and blue (B) colors, the three primary colors of light. For example, assuming that light enters the projection screen 10 vertically to it, the projector 21 is made to project light in selective reflection wave ranges with center wavelengths that fall in the ranges of 430–460 nm, 540–570 nm, and 580–620 nm. For this reason, it is preferable to make the projection screen 10 selectively reflect only light in wave ranges identical with the wave ranges of the imaging light projected from the projector 21. By so making the projection screen 10, it is possible to prevent environmental light, such as sunlight and light from lighting fixtures, in the visible region but not in the above-described wave ranges, from being reflected from the projection screen 10, thereby enhancing image contrast.

The projection system 20 usually comprises an illuminant 23 that is fixed to an illuminant-fixing member 25 such as the ceiling of a room, and this illuminant 23 illuminates a space in which the projection screen 10 is placed.

As shown in FIG. 15, in the case where the illuminant 23 is so positioned that the light 34 emitted from the illuminant 23 directly illuminates the projection screen 10, it is preferable to make the light 34 to be emitted from the illuminant 23 toward the projection screen 10 mainly contain a polarized-light component (e.g., left-handed circularly polarized light) that is different from the polarized-light component which the projection screen 10 selectively reflects. By so making the light 34, it is possible to effectively prevent the light 34 from being reflected from the polarized-light selective reflection layer 11 in the projection screen 10, thereby enhancing image contrast.

It is possible to control the state of polarization of the light 34 that is emitted from the illuminant 23, by providing, in the vicinity of the illuminant 23, a polarizer film 24 capable of transmitting left-handed circularly polarized light. An absorption circular polarizer or a polarized-light separator (reflection circular polarizer) may be used as the polarizer film 24. Examples of polarized-light separators useful herein include circularly-polarized-light separators using cholesteric liquid crystal layers, and linearly-polarized-light separators containing, on the exit side, retardation layers for converting linearly polarized light into circularly polarized light. These polarized-light separators are superior to absorption circular polarizers because the loss of the amount of light they cause is smaller than the loss of the same which the absorption circular polarizers do.

Figure 16:
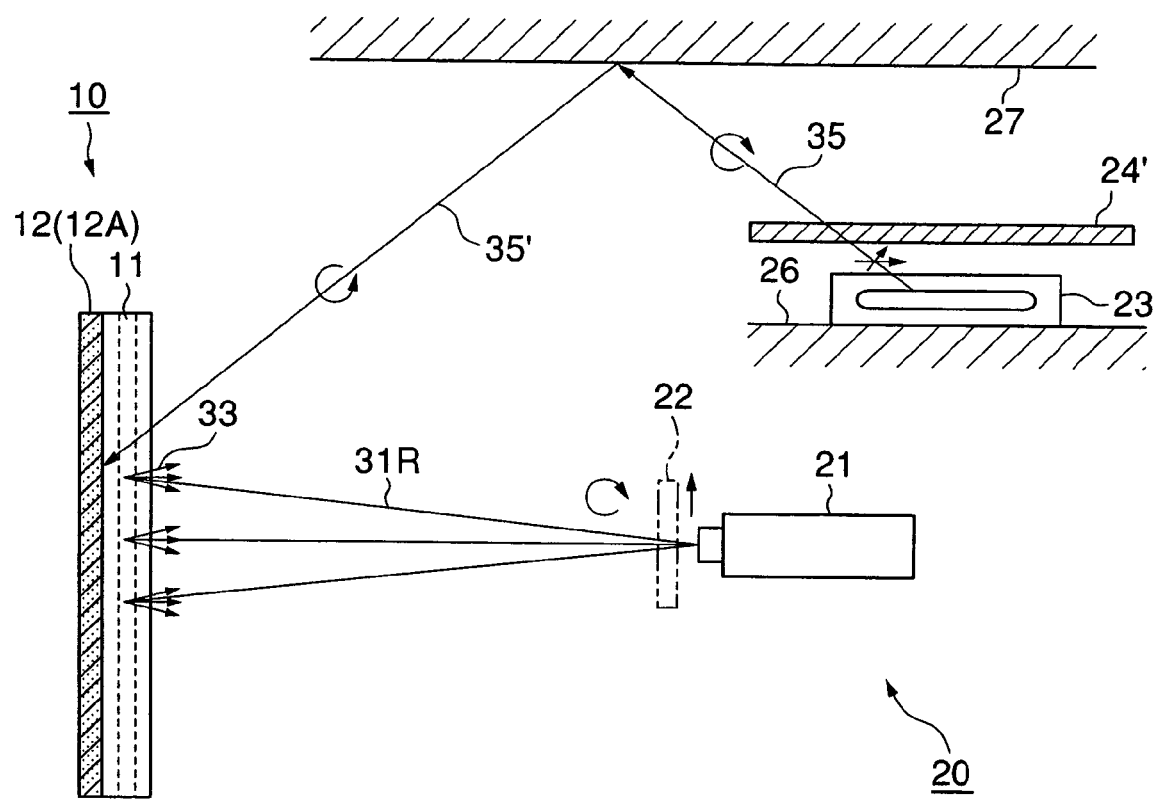
FIG. 16 is a diagrammatic view showing another projection system comprising the projection screen shown in FIG. 1.

In the projection system 20 shown in FIG. 15, the light 34 emitted from the illuminant 23 directly illuminates the projection screen 10. The present invention is not limited to this and also includes an embodiment in which the illuminant 23 is, as shown in FIG. 16, fixed on an illuminant-fixing member 26 other than the ceiling so that the light 35 emitted from the illuminant 23 indirectly illuminates, as light 35', the projection screen 10 via a reflector 27 such as the ceiling. In this case, circularly polarized light reverses in the state of polarization when reflected from the reflector 27. It is, therefore, preferable to make the light 35 to be emitted from the illuminant 23 toward the reflector 27 mainly contain a polarized-light component (e.g., right-handed circularly polarized light) that is identical with the polarized-light component which the projection screen 10 selectively reflects, by providing a polarizer film 24' or the like that transmits right-handed circularly polarized light, as in the case shown in FIG. 15. The polarizer film 24' may be the same as the above-described polarizer film 24. If such a polarizer film is used, the light 35' whose state of polarization has been reversed by the reflector 27 is to mainly contain a polarized-light component (e.g., left-handed circularly polarized light) that is different from the polarized-light component which the projection screen 10 selectively reflects. It is, therefore, possible to effectively prevent the light 35' from being reflected from the polarized-light selective reflection layer 11 in the projection screen 10, thereby enhancing image contrast.

EXAMPLES

A specific example of the above-described embodiments will now be given below.

Example

A first cholesteric liquid crystal solution having a selective reflection wave range with a center wavelength of 600 nm was prepared by dissolving, in cyclohexanone, a monomer-containing liquid crystal consisting of a main component that was an ultraviolet-curing, nematic liquid crystal (94.7% by weight) and a chiral agent (5.3% by weight).

A liquid crystal containing a compound represented by the above chemical formula (2-xi) was used as the nematic liquid crystal.

A compound represented by the above chemical formula (5) was used as the polymerizable chiral agent.

To the first cholesteric liquid crystal solution was added 50/0 by weight of a photopolymerization initiator available from Ciba Specialty Chemicals K.K., Japan.

By a bar coating method, the above-prepared first cholesteric liquid crystal solution was applied to a substrate, a 200 mm×200 mm black-colored PET film coated with an adherent layer (Lumirror/AC-X manufactured by Panack Co., Ltd., Japan).

This substrate was heated in an oven at 80° C. for 90 seconds, thereby conducting aligning treatment (drying treatment). Thus, a cholesteric liquid crystal layer containing no solvent was obtained.

Thereafter, 50 Mw/cm$^2$ of ultraviolet light with a wavelength of 365 nm was applied to this cholesteric liquid crystal layer for 1 minute for curing, thereby obtaining a first partial selective reflection layer having a selective reflection wave range with a center wavelength of 600 nm.

Similarly, a second cholesteric liquid crystal solution was applied directly to the first partial selective reflection layer and then subjected to aligning treatment (drying treatment) and curing treatment. Thus, a second partial selective reflection layer having a selective reflection wave range with a center wavelength of 550 nm was obtained. The procedure used for preparing the second cholesteric liquid crystal solution was the same as the procedure used for preparing the first cholesteric liquid crystal solution, provided that the nematic liquid crystal and the chiral agent were mixed in such a proportion that the resulting layer had a selective reflection wave range with a center wavelength of 550 nm.

Similarly, a third cholesteric liquid crystal solution was applied directly to the second partial selective reflection layer and then subjected to aligning treatment (drying treatment) and curing treatment. Thus, a third partial selective reflection layer having a selective reflection wave range with a center wavelength of 450 nm was obtained. The procedure used for preparing the third cholesteric liquid crystal solution was the same as the procedure used for preparing the first cholesteric liquid crystal solution, provided that the nematic liquid crystal and the chiral agent were mixed in such a proportion that the resulting layer had a selective reflection wave range with a center wavelength of 450 nm.

Thus, there was obtained a projection screen 1 comprising a polarized-light selective reflection layer composed of the third partial selective reflection layer for selectively reflecting light in the blue (B) color wave range (light in the selective reflection wave range with a center wavelength of 450 nm), the second partial selective reflection layer for selectively reflecting light in the green (G) color wave range (light in the selective reflection wave range with a center wavelength of 550 nm), and the first partial selective reflection layer for selectively reflecting light in the red® color wave range (light in the selective reflection wave range with a center wavelength of 600 nm) that were layered in this order, the third partial selective reflection layer being on the observation side. The thickness of the first partial selective reflection layer was made 5 μm, that of the second partial selective reflection layer was made 4 μm, and that of the third partial selective reflection layer was made 3 μm. Each partial selective reflection layer constituting the polarized-light selective reflection layer in the projection screen 1 had a cholesteric liquid crystalline structure in the state of non-planar orientation.

COMPARATIVE EXAMPLE

A projection screen 2 was prepared by the same production process as in Example, provided that the partial selective reflection layers in the polarized-light selective reflection layer were layered in the order different from that in Example. Specifically, in the projection screen 2, the partial selective reflection layer for selectively reflecting light in the red® color wave range (light in the selective reflection wave range with a center wavelength of 600 nm), the partial selective reflection layer for selectively reflecting light in the green (G) color wave range (light in the selective reflection wave range with a center wavelength of 550 nm), and the partial selective reflection layer for selectively reflecting light in the blue (B) color wave range (light in the selective reflection wave range with a center wavelength of 450 nm) are layered in this order, the firstly-mentioned partial selective reflection layer being on the observation side.

RESULTS OF EVALUATION

A white-color image was projected on the above-described projection screen 1, 2 by the use of a projector with a light source capable of emitting light having R, G and B peaks (at 460 nm, 545 nm and 590 nm, respectively). By adjusting the distance between the projection screen 1, 2 and the projector that was placed right in front of the projection screen 1, 2, the size of the image to be projected on the projection screen 1, 2 was controlled to 60 inches.

The white colors of the images projected on the projection screens 1, 2 under these conditions were observed from behind the projector (that is, from a point situated nearly right in front of the projection screens 1, 2).

The results were as follows: the reflectance of the projection screen 2 for blue light was low, so that the image projected on this screen appeared white with a yellow tint; while the image projected on the projection screen 1 appeared well-balanced white.

What is claimed is:

1. A projection screen for displaying an image by reflecting imaging light that is projected from an observation side, the projection screen comprising:
a polarized-light selective reflection layer that selectively reflects a specific polarized-light component, wherein the polarized-light selective reflection layer comprises two or more partial selective reflection layers, made of organic films, wherein the partial selective reflection layers themselves have a diffusing property and have a cholesteric liquid crystalline structure, a structural non-uniformity of which reflects in diffused directions the specific polarized-light component and wherein the cholesteric liquid crystalline structure of each of the partial selective reflection layers comprises a plurality of helical structure parts that are different in helical axial direction, layered one over another, and, of these partial selective reflection layers, a first partial selective reflection layer for reflecting light in a wave range for a color that is most readily absorbed by an organic film is arranged as the outermost layer on the observation side.

2. The projection screen according to claim 1, wherein the polarized-light selective reflection layer selectively reflects light in a specific wave range that covers only part of a visible region.

3. The projection screen according to claim 1, wherein the two or more partial selective reflection layers comprise a second partial selective reflection layer having a selective reflection wave range that extends on a longer wavelength side than a selective reflection wave range of the first partial selective reflection layer does, and a third partial selective reflection layer having a selective reflection wave range that extends on a longer wavelength side than the selective reflection wave range of the second partial selective reflection layer does, and the first, the second, and the third partial selective reflection layers are layered in this order, the first partial selective reflection layer being on the observation side.

4. The projection screen according to claim 3, wherein the second and the third partial selective reflection layers are integrated.

5. The projection screen according to claim 3, wherein the first, the second, and the third partial selective reflection layers selectively reflect light in wave ranges with center wavelengths that fall in the ranges of 430–460 nm, 540–570 nm and 580–620 nm, respectively, assuming that light enters the polarized-light selective reflection layer vertically to it.

6. The projection screen according to claim 1, wherein the two or more partial selective reflection layers comprise a second partial selective reflection layer having a selective reflection wave range that extends on a longer wavelength side than a selective reflection wave range of the first partial selective reflection layer does, and a third partial selective reflection layer having a selective reflection wave range that extends on a longer wavelength side than the selective reflection wave range of the second partial selective reflection layer does, and the first, the third, and the second partial selective reflection layers are layered in this order, the first partial selective reflection layer being on the observation side.

7. The projection screen according to claim 6, wherein the first, the second, and the third partial selective reflection layers selectively reflect light in wave ranges with center wavelengths that fall in the ranges of 430–460 nm, 540–570 nm and 580–620 nm, respectively, assuming that light enters the polarized-light selective reflection layer vertically to it.

8. The projection screen according to claim 1, wherein the specific polarized-light component is right- or left-handed circularly polarized light.

9. The projection screen according to claim 1, wherein the specific polarized-light component is linearly polarized light of one vibration direction.

10. The projection screen according to claim 1, further comprising a diffusing element that diffuses light that is reflected from the partial selective reflection layers in the polarized-light selective reflection layer.

11. The projection screen according to claim 1, wherein the cholesteric liquid crystalline structures of the partial selective reflection layers have different helical pitches.

12. The projection screen according to claim 1, further comprising a substrate that supports the polarized-light selective reflection layer.

13. The projection screen according to claim 12, wherein the substrate is an absorptive substrate comprising a light-absorbing layer adapted to absorb light in a visible region.

14. The projection screen according to claim 12, wherein the substrate is a transparent substrate adapted to transmit at least part of light in a visible region.

15. The projection screen according to claim 1, wherein the polarized-light selective reflection layer comprises an intermediate layer having a barrier property, provided between each neighboring two of the partial selective reflection layers.

16. The projection screen according to claim 1, wherein the polarized-light selective reflection layer comprises an intermediate layer having an adhesion property, provided between each neighboring two of the partial selective reflection layers.

17. The projection screen according to claim 1, further comprising a functional layer containing at least one layer selected from a group consisting of a hard coat layer, an anti-glaring layer, an anti-reflection layer, an ultraviolet-light-absorbing layer, and an antistatic layer.

18. The projection screen according to claim 17, wherein the functional layer is an anti-glaring layer, which is made of a layer with an irregularly roughened surface, isotropic with respect to refractive index.

19. The projection screen according to claim 18, wherein the anti-glaring layer is a TAC film with a matte surface.

20. The projection screen according to claim 1, wherein a surface of the polarized-light selective reflection layer on which imaging light is projected is provided with irregularities, by which an anti-glaring property is imparted to the polarized-light selective reflection layer.

21. A projection system comprising: the projection screen according to claim 1; and a projector that projects imaging light on the projection screen.

* * * * *